(12) United States Patent
Namikata

(10) Patent No.: US 8,159,693 B2
(45) Date of Patent: Apr. 17, 2012

(54) PRINTING SYSTEM, PRINTING APPARATUS, AND JOB CONTROL METHOD

(75) Inventor: Takeshi Namikata, Yokohama (JP)

(73) Assignee: Canon Kabushiki Kaisha (JP)

( * ) Notice: Subject to any disclaimer, the term of this patent is extended or adjusted under 35 U.S.C. 154(b) by 1282 days.

(21) Appl. No.: 11/838,205

(22) Filed: Aug. 13, 2007

(65) Prior Publication Data
US 2008/0055636 A1 Mar. 6, 2008

(30) Foreign Application Priority Data
Aug. 30, 2006 (JP) ................................. 2006-234364

(51) Int. Cl.
*G06F 15/00* (2006.01)

(52) U.S. Cl. .................. 358/1.14; 358/1.13; 358/1.15; 358/1.16; 358/1.17

(58) Field of Classification Search .............. 358/1.14, 358/1.13, 1.15, 1.16, 1.17
See application file for complete search history.

(56) References Cited

U.S. PATENT DOCUMENTS

| | | | |
|---|---|---|---|
| 3,907,274 | A | 9/1975 | D'Amato et al. |
| 5,640,232 | A | 6/1997 | Miyake et al. |
| 7,072,052 | B1 | 7/2006 | Tanahashi et al. |
| 7,202,964 | B2 | 4/2007 | Christiansen |
| 2002/0026463 | A1 | 2/2002 | Utsunomiya |
| 2002/0171864 | A1* | 11/2002 | Sesek ........................... 358/1.15 |
| 2003/0098987 | A1 | 5/2003 | Fiske |
| 2004/0061892 | A1 | 4/2004 | Ferlitsch |
| 2004/0207153 | A1 | 10/2004 | Kida |
| 2005/0017426 | A1 | 1/2005 | Hirata et al. |
| 2005/0084277 | A1 | 4/2005 | Kushida |
| 2005/0105117 | A1* | 5/2005 | Oh et al. ....................... 358/1.13 |
| 2005/0105129 | A1 | 5/2005 | Takahashi |
| 2005/0141030 | A1* | 6/2005 | Tuchitoi et al. .............. 358/1.16 |
| 2005/0220475 | A1 | 10/2005 | Kasahara |
| 2007/0019224 | A1* | 1/2007 | Okada et al. ................. 358/1.13 |
| 2007/0024891 | A1* | 2/2007 | Kim ............................. 358/1.14 |
| 2007/0085263 | A1* | 4/2007 | Machida et al. .............. 271/145 |

FOREIGN PATENT DOCUMENTS

| | | |
|---|---|---|
| EP | 1130480 A2 | 9/2001 |
| JP | 2000-159416 A | 6/2000 |
| JP | 2002362821 A | 12/2002 |
| JP | 2003-228471 A | 8/2003 |

(Continued)

OTHER PUBLICATIONS

Chinese Office Action dated Apr. 3, 2009 issued in Chinese Application No. 2007101387806, which corresponds to related U.S. Appl. No. 11/838,206.
Korean Office Action dated May 11, 2009 issued in Korean Application No. 10-2007-0087896, which corresponds to related U.S. Appl. No. 11/838,207.

(Continued)

*Primary Examiner* — Mark Zimmerman
*Assistant Examiner* — Mark Milia
(74) *Attorney, Agent, or Firm* — Rossi, Kimms & McDowell LLP

(57) ABSTRACT

A printing system adapted to be able to successively process a plurality of jobs by a printing apparatus has a designation unit adapted to designate, from the plurality of jobs, a job that processing by the printing apparatus is to be suspended; and a controller adapted to control the printing apparatus to suspend the processing of the job designated by the designation unit, wherein the controller controls the printing apparatus so as to suspend processing of another job in accordance with a suspension factor of the job designated by the designation unit.

11 Claims, 21 Drawing Sheets

FOREIGN PATENT DOCUMENTS

| | | |
|---|---|---|
| JP | 2004-310746 A | 11/2004 |
| JP | 2004-310747 A | 11/2004 |
| JP | 2006-078747 A | 3/2006 |

OTHER PUBLICATIONS

Related co-pending U.S. Appl. No. 11/838,204; Bungo Shimada; "Printing System, Printing Apparatus, and Job Processing Method"; filed Aug. 13, 2007; Spec. pp. 1-56; Figs. 1-16.

Related co-pending U.S. Appl. No. 11/838,206; Masahiko Tominaga et al.; "Printing System and Control Method Therefor"; filed Aug. 13, 2007; Spec. pp. 1-68, Figs. 1-23.

Related co-pending U.S. Appl. No. 11/838,207; Yuki Hatakeyama; "Printing System and Control Method Therefor"; filed Aug. 13, 2007; Spec. 1-53; Figs. 1-30.

Japanese Office Action to corresponding JP 2006-223514, dated Nov. 25, 2011.

* cited by examiner

F I G. 5
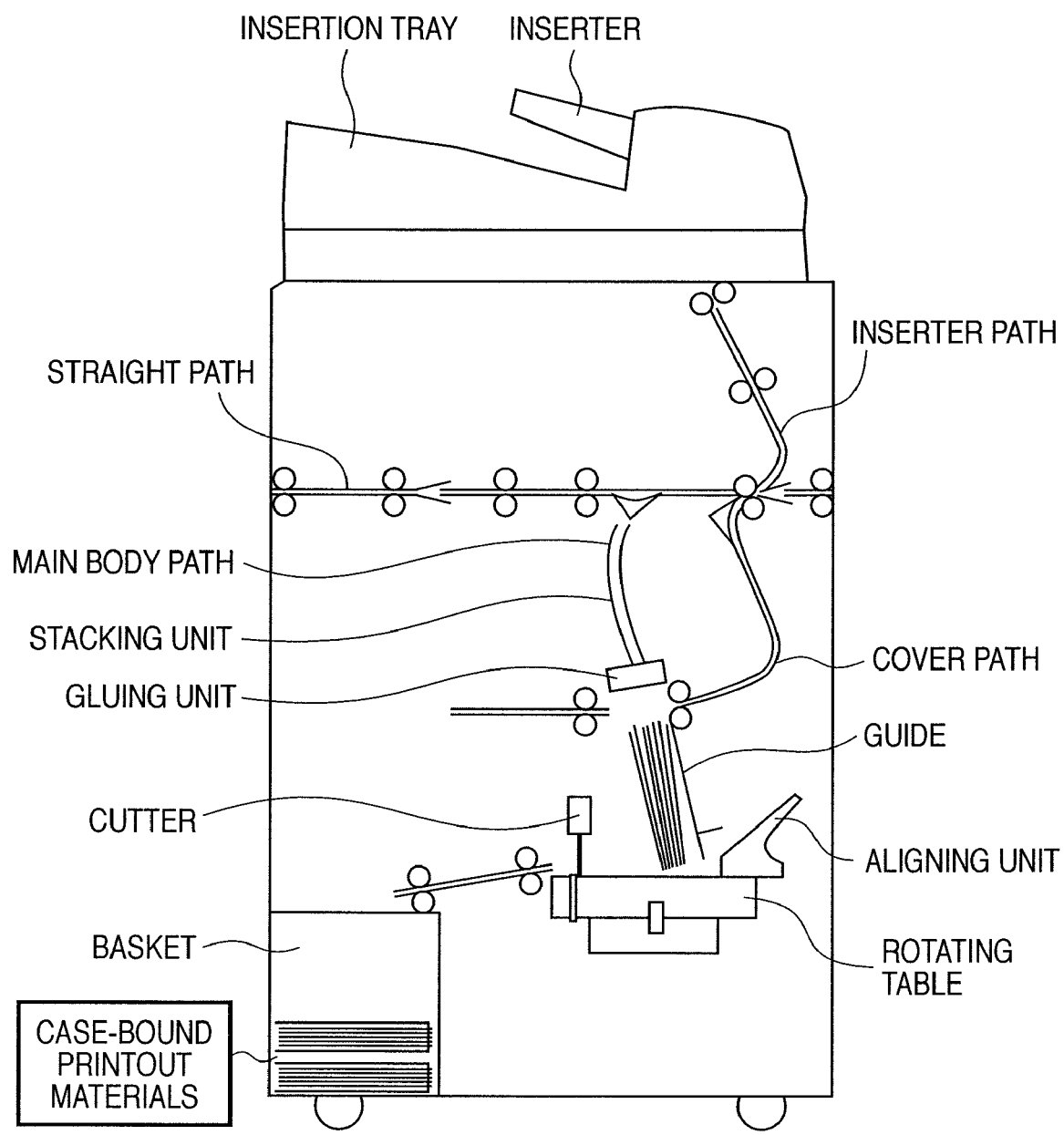

FIG. 9

✱ SYSTEM MANAGEMENT SETTING

[REGISTRATION & SETTING OF INLINE SHEET PROCESSING APPARATUSES]

PLEASE REGISTER TYPES OF SHEET PROCESSING APPARATUSES TO BE CONNECTED TO PRINTING APPARATUS AND THEIR CONNECTION ORDER.
YOU CAN CONNECT MAXIMUM OF FIVE SHEET PROCESSING APPARATUSES.
PLEASE CONNECT SADDLE STITCHING APPARATUS LAST.

| 1 | | ▲ | ADVANCED SETTINGS |
| 2 | | ▲ | ADVANCED SETTINGS |
| 3 | | ▲ | ADVANCED SETTINGS |
| 4 | | ▲ | ADVANCED SETTINGS |

REGISTER    CLOSE

| JOB NUMBER 2101 | RECEPTION TIME 2102 | JOB TYPE 2103 | FINISHING DESIGNATION 2104 | COLOR/ MONOCHROME 2105 | PAPER 2106 | JOB STATUS 2107 | JOB STANDBY REASON 2108 |
|---|---|---|---|---|---|---|---|
| 0007 | 17:48 | COPY | STAPLING, CUTTING | COLOR | A4 PLAIN PAPER | DURING PRINTING | – |
| 0008 | 17:48 | PDL | STACKER | COLOR | A3 COATED PAPER | STANDBY FOR PRINTING | STANDBY |
| 0009 | 17:48 | PDL | STAPLING, FOLDING, CUTTING | COLOR | A3 WIDE PLAIN PAPER | STANDBY FOR PRINTING | STANDBY |
| 0010 | 17:48 | PDL | CASE BINDING | COLOR | A4 PLAIN PAPER | STANDBY FOR PRINTING | STANDBY |
| 0011 | 17:49 | COPY | CUTTING | COLOR | A3 COATED PAPER | STANDBY FOR PRINTING | STANDBY |

2401 — NAME OF JOB TO BE SUSPENDED : JOB A OF ACCEPTANCE NUMBER 0001

NUMBER OF PAGES : 10, PRINTING CONDITIONS :

PLEASE SELECT REASON FOR SUSPENSION.

IF YOU SELECT [SUSPEND TO CHECK (OR REPLENISH) PAPER USED TO PRINT], YOU CAN ALSO SUSPEND PRINTING OF JOBS USING PAPER OF SAME PAPER ATTRIBUTES (PAPER SIZE, PAPER TYPE, AND GRAMMAGE) AS THOSE OF TARGET JOB.

IF YOU SELECT [SUSPEND TO CHECK FINISHER (OR REPLENISH MEMBERS)], YOU CAN ALSO SUSPEND PRINTING OF JOBS REQUIRING SAME TYPE OF FINISHING AS THAT OF TARGET JOB.

IF YOU SELECT [SUSPEND TO CHECK TONER (OR REPLENISH TONER)], YOU CAN ALSO SUSPEND PRINTING OF JOBS WITH SAME COLOR ATTRIBUTE AS THAT OF TARGET JOB.

2402 — SUSPEND TO CHECK PRINT RESULT

2403 — SUSPEND TO CHECK (OR REPLENISH) PAPER USED TO PRINT

2404 — SUSPEND TO CHECK FINISHER (OR REPLENISH MEMBERS)

2405 — SUSPEND TO CHECK TONER (OR REPLENISH TONER)

RETURN   CLOSE

0007 COPY     0099 / 0100

FIG. 15

SUSPEND TO CHECK PRINT RESULT

| PRINT STATUS | | CHECK CONSUMABLES | | OTHER STATUSES |

| JOB STATUS | JOB LOG | | | |

■ TOTAL WAIT TIME : LESS THAN 1 MIN

| ACCEPTANCE NUMBER | TIME | JOB NAME | USER NAME | STATUS | WAIT TIME (ABOUT) |
|---|---|---|---|---|---|
| 0007 | 17:48 | COPY | COPY USER | SUSPENDED | LESS THAN 1 MIN |
| 0008 | 17:48 | COPY | COPY USER | DURING PRINTING | LESS THAN 1 MIN |
| 0009 | 17:48 | COPY | COPY USER | STANDBY FOR PRINTING | LESS THAN 1 MIN |
| 0010 | 17:48 | COPY | COPY USER | STANDBY FOR PRINTING | LESS THAN 1 MIN |
| 0011 | 17:49 | COPY | COPY USER | STANDBY FOR PRINTING | LESS THAN 1 MIN |

◁ 1/1 ▷

| PRIORITY PRINT | DETAILED INFORMATION ▲ | STOP | SECURE PRINT | CHECK PRINT |
|---|---|---|---|---|

CLOSE

0099 / 0100

| RESUME |

0007 COPY

SUSPEND TO CHECK (OR REPLENISH) PAPER USED TO PRINT

| PRINT STATUS | JOB LOG | CHECK CONSUMABLES | | OTHER STATUSES |
|---|---|---|---|---|

■ TOTAL WAIT TIME : LESS THAN 1 MIN

| JOB STATUS | | | | | |
|---|---|---|---|---|---|
| ACCEPTANCE NUMBER | TIME | JOB NAME | USER NAME | STATUS | WAIT TIME (ABOUT) |
| ↑ 0007 | 17:48 | COPY | COPY USER | SUSPENDED | LESS THAN 1 MIN |
| ● 0008 | 17:48 | COPY | COPY USER | DURING PRINTING | LESS THAN 1 MIN |
| ● 0009 | 17:48 | COPY | COPY USER | STANDBY FOR PRINTING | LESS THAN 1 MIN |
| ● 0010 | 17:48 | COPY | COPY USER | SUSPENDED | LESS THAN 1 MIN |
| ● 0011 | 17:49 | COPY | COPY USER | STANDBY FOR PRINTING | LESS THAN 1 MIN |

| PRIORITY PRINT ▲ | DETAILED INFORMATION ▲ | STOP | | | |
|---|---|---|---|---|---|

0099 / 0100      🔒 SECURE PRINT      CHECK PRINT ▲

RESUME      0007 COPY      CLOSE

F I G. 17

SUSPEND TO CHECK FINISHER (OR REPLENISH MEMBERS)

| PRINT STATUS | JOB LOG | CHECK CONSUMABLES | | OTHER STATUSES |
|---|---|---|---|---|

■ TOTAL WAIT TIME : LESS THAN 1 MIN

| JOB STATUS | | | | | |
|---|---|---|---|---|---|
| ACCEPTANCE NUMBER | TIME | JOB NAME | USER NAME | STATUS | WAIT TIME (ABOUT) |
| 0007 | 17:48 | COPY | COPY USER | SUSPENDED | LESS THAN 1 MIN |
| 0008 | 17:48 | COPY | COPY USER | DURING PRINTING | LESS THAN 1 MIN |
| 0009 | 17:48 | COPY | COPY USER | SUSPENDED | LESS THAN 1 MIN |
| 0010 | 17:48 | COPY | COPY USER | STANDBY FOR PRINTING | LESS THAN 1 MIN |
| 0011 | 17:49 | COPY | COPY USER | SUSPENDED | |

◁ 1/1 ▷

| RESUME | PRIORITY PRINT ▲ | DETAILED INFORMATION ▲ | STOP | SECURE PRINT | CHECK PRINT ▲ | CLOSE |
|---|---|---|---|---|---|---|

0099 / 0100

0007 COPY

FIG. 18

SUSPEND TO CHECK TONER (OR REPLENISH TONER)

| PRINT STATUS | | CHECK CONSUMABLES | | OTHER STATUSES | |
|---|---|---|---|---|---|

JOB STATUS | JOB LOG

■ TOTAL WAIT TIME : LESS THAN 1 MIN

| ACCEPTANCE NUMBER | TIME | JOB NAME | USER NAME | STATUS | WAIT TIME (ABOUT) |
|---|---|---|---|---|---|
| 0007 | 17:48 | COPY | COPY USER | SUSPENDED | LESS THAN 1 MIN |
| 0008 | 17:48 | COPY | COPY USER | SUSPENDED | LESS THAN 1 MIN |
| 0009 | 17:48 | COPY | COPY USER | SUSPENDED | LESS THAN 1 MIN |
| 0010 | 17:48 | COPY | COPY USER | SUSPENDED | LESS THAN 1 MIN |
| 0011 | 17:49 | COPY | COPY USER | SUSPENDED | LESS THAN 1 MIN |

1/1

| PRIORITY PRINT | DETAILED INFORMATION ▲ | STOP | SECURE PRINT | CHECK PRINT |
|---|---|---|---|---|

0099 / 0100

RESUME   CLOSE

0007 COPY

FIG. 19

RESUME OF SUSPENDED JOB

2901 — RESUME OF JOB : JOB BEING SUSPENDED

PLEASE SELECT RESUMABLE JOB.

IF YOU SELECT "END OF CHECKING PRINT RESULT", JOB SUSPENDED TO CHECK PRINT RESULT IS RESUMED.

IF YOU SELECT "END OF CHECKING PAPER USED TO PRINT", JOB SUSPENDED TO CHECK PAPER USED TO PRINT IS RESUMED.

IF YOU SELECT "END OF CHECKING FINISHER (OR REPLENISHING MEMBERS)", JOB SUSPENDED TO CHECK FINISHER IS RESUMED.

IF YOU SELECT "END OF CHECKING TONER (OR REPLENISHING TONER)", JOB SUSPENDED TO CHECK TONER IS RESUMED.

2902 — END OF CHECKING PRINT RESULT

2903 — END OF CHECKING (OR REPLENISHING) PAPER USED TO PRINT

2904 — END OF CHECKING FINISHER (OR REPLENISHING MEMBERS)

2905 — END OF CHECKING TONER (OR REPLENISHING TONER)

RETURN

FIG. 20

| PRINT STATUS | | | CHECK CONSUMABLES | | OTHER STATUSES |
|---|---|---|---|---|---|

| JOB STATUS | JOB LOG | | | ■ TOTAL WAIT TIME : LESS THAN 1 MIN | |
|---|---|---|---|---|---|

| ACCEPTANCE NUMBER | TIME | JOB NAME | USER NAME | STATUS | WAIT TIME (ABOUT) |
|---|---|---|---|---|---|
| 📄 0007 | 17:48 | 🗇 COPY | COPY USER | DURING PRINTING | LESS THAN 1 MIN |
| ● 0008 | 17:48 | 🗇 COPY | COPY USER | STANDBY FOR PRINTING | LESS THAN 1 MIN |
| ● 0009 | 17:48 | 🗇 COPY | COPY USER | STANDBY FOR PRINTING | LESS THAN 1 MIN |
| ● 0010 | 17:48 | 🗇 COPY | COPY USER | STANDBY FOR PRINTING | LESS THAN 1 MIN |
| ● 0011 | 17:49 | 🗇 COPY | COPY USER | STANDBY FOR PRINTING | LESS THAN 1 MIN |

◁ 1/1 ▷

| PRIORITY PRINT | DETAILED INFORMATION ▲ | STOP | 🔒● SECURE PRINT ▲ |
|---|---|---|---|

| SUSPEND PRINTING | CHECK FINISHER | CHECK PAPER | CHECK PRINT |
|---|---|---|---|

CHECK TONER AMOUNT

CLOSE 3001
3002
3003

PRINTING SYSTEM, PRINTING APPARATUS, AND JOB CONTROL METHOD

BACKGROUND OF THE INVENTION

1. Field of the Invention

The present invention relates to a printing system adapted to be able to successively process a plurality of jobs by a printing apparatus, a printing apparatus, and a job control method.

2. Description of the Related Art

Recently, a POD (Print On Demand) printing system using an electrophotographic or inkjet printing apparatus has been proposed (see, e.g., patent reference 1: Japanese Patent Laid-Open No. 2004-310746, and patent reference 2: Japanese Patent Laid-Open No. 2004-310747).

In a printing system using a general digital multifunctional peripheral, jobs for which the user designates printout are temporarily accumulated in the print queue, and printed out in the job acceptance order. In the POD environment, the number of print sheets is larger than in the office environment, and a plurality of jobs are accumulated in the print queue. It is necessary to perform job handling suited to the POD environment in order to output jobs without decreasing productivity or simplify the operator operation as much as possible.

When the operator suspends a job in order to check the finish of a print job being output in the environment where a plurality of jobs are accumulated, all subsequent print jobs stand by, decreasing printout productivity.

When the operator suspends a specific job in order to check the remaining number of sheets of a type used by the specific print job, other print jobs designated to use the same type of sheets must also stop. In this case, the user must designate other print jobs one by one, impairing operability.

SUMMARY OF THE INVENTION

The present invention provides a convenient printing system adaptable not only to the office environment but also to the POD environment, a printing apparatus, and a job control method.

Moreover, the present invention provides a mechanism of minimizing intervention work by an operator that may occur in the POD environment due to the specifications of an image forming apparatus designed in consideration of only the office environment. Efficient work is implemented by reducing the workload of the operator.

Furthermore, the present invention provides a mechanism capable of flexibly coping with various needs from various users as much as possible in consideration of various situations and use environments.

Moreover, when a plurality of jobs are input and a job must be suspended, the suspension of a print job is controlled in accordance with the suspension factor and processing of jobs which can continue processing is kept, thereby maintaining productivity.

Furthermore, jobs are suspended by designating a suspension factor without designating the jobs one by one, thereby improving operator operability.

According to one aspect of the present invention, there is provided a printing system adapted to be able to successively process a plurality of jobs by a printing apparatus, comprising: a designation unit adapted to designate, from the plurality of jobs, a job that processing by the printing apparatus is to be suspended; and a controller adapted to control the printing apparatus to suspend the processing of the job designated by the designation unit, wherein the controller controls the printing apparatus so as to suspend processing of another job in accordance with a suspension factor of the job designated by the designation unit.

According to another aspect of the present invention, there is provided a printing apparatus in a printing system adapted to be able to successively process a plurality of jobs by the printing apparatus, the apparatus comprising: a designation unit adapted to designate, from the plurality of jobs, a job that processing by the printing apparatus is to be suspended; and a controller adapted to control the printing apparatus to suspend the processing of the job designated by the designation unit, wherein the controller controls the printing apparatus so as to suspend processing of another job in accordance with a suspension factor of the job designated by the designation unit.

According to still another aspect of the present invention, there is provided a job control method in a printing system adapted to be able to successively process a plurality of jobs by a printing apparatus, the method comprising: designating, from the plurality of jobs, a job that processing by the printing apparatus is to be suspended; and controlling the printing apparatus to suspend the processing of the job designated by a designation unit, wherein the printing apparatus is controlled to suspend processing of another job in accordance with a suspension factor of the job designated by the designation unit.

Further features of the present invention will become apparent from the following description of exemplary embodiments with reference to the attached drawings.

BRIEF DESCRIPTION OF THE DRAWINGS

FIG. 5 is a side sectional view showing an internal structure of a glue binding apparatus;

FIG. 9 is a view showing an example of a window to register and set a sheet processing apparatus;

FIG. 10 is a view showing an example of a window to select a sheet processing type on the display unit of a computer;

FIG. 11 is a table showing an example of print queue management information in the embodiment;

FIG. 14 is a view showing an example of a user interface window capable of selecting a suspension reason;

FIG. 15 is a view showing an example of a job status window upon suspending a job in order to check the print result;

FIG. 16 is a view showing an example of a job status window upon suspending a job in order to check paper;

FIG. 17 is a view showing an example of a job status window upon suspending a job in order to check the finisher;

FIG. 18 is a view showing an example of a job status window upon suspending a job in order to check toner;

FIG. 19 is a view showing an example of a user interface window capable of selecting resume of a suspended job;

FIG. 20 is a view showing an example of a user interface window capable of selecting a suspension reason in another operation method.

DESCRIPTION OF THE EMBODIMENTS

The best mode for carrying out the present invention will be explained in detail below with reference to the accompanying drawings.

Figure 1:
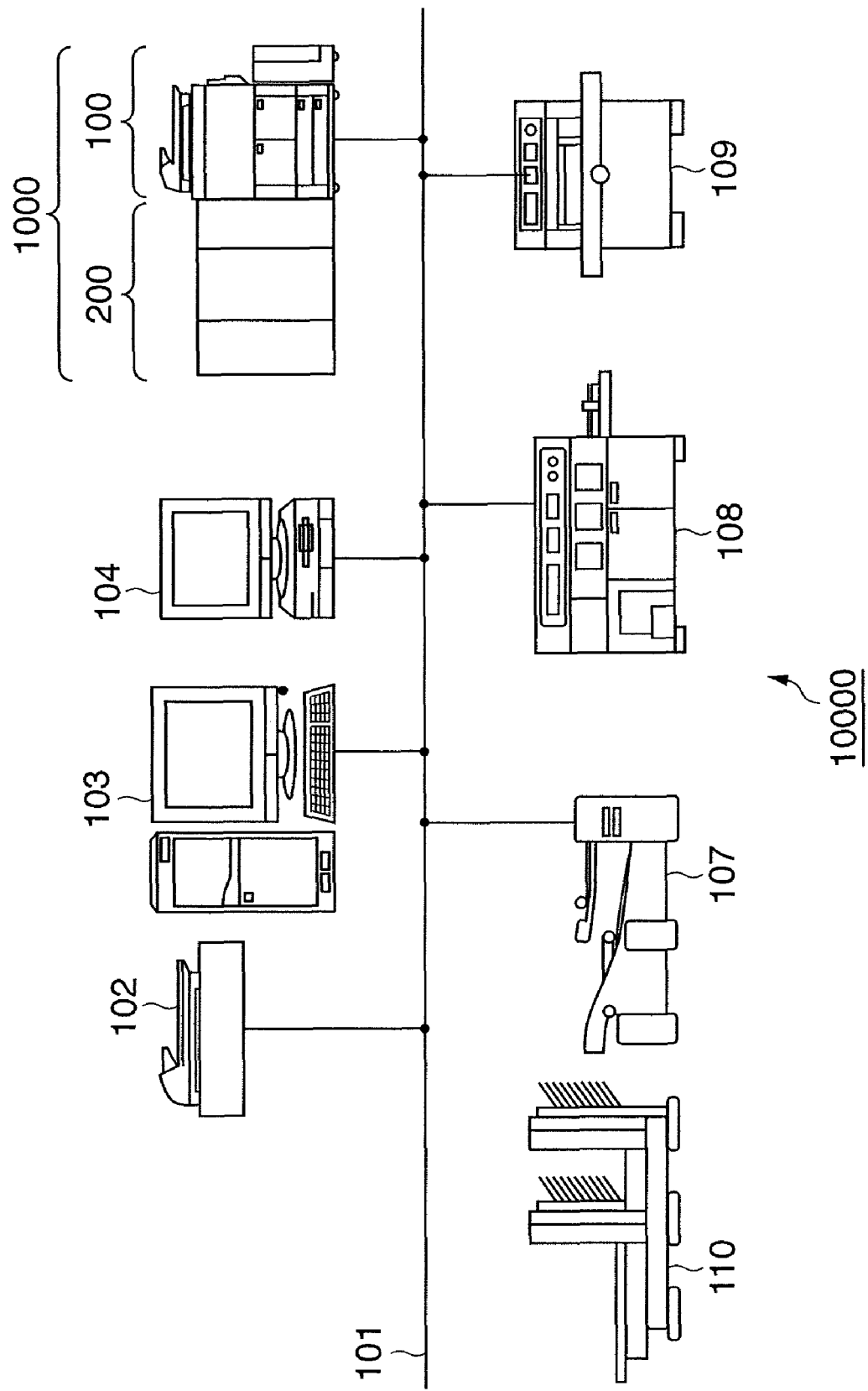
FIG. 1 is a view for explaining an overall configuration of a printing environment 10000 including a printing system 1000 to be controlled.

A POD system 10000 in FIG. 1 comprises a printing system 1000, scanner 102, server computer (PC) 103, and client computer (PC) 104, which are connected to each other via a network 101. Sheet processing apparatuses such as a paper folding apparatus 107, case binding apparatus 108, cutting apparatus 109, and saddle stitching apparatus 110 are also connected to the POD system 10000.

The printing system 1000 comprises a printing apparatus 100 and sheet processing apparatus 200. As an example of the printing apparatus 100, the embodiment will describe an MFP (Multi Function Peripheral) having a plurality of functions such as the copy and printer functions. However, the printing apparatus 100 may be a single function type printing apparatus having only the copy or printer function.

The server computer (PC) 103 manages data exchange with a variety of apparatuses connected to the network 101. The client computer (PC) 104 transmits image data to the printing apparatus 100 and PC 103 via the network 101. The paper folding apparatus 107 folds sheets printed by the printing apparatus 100. The case binding apparatus 108 case-binds sheets printed by the printing apparatus 100. The cutting apparatus 109 cuts a bundle of sheets printed by the printing apparatus 100. The saddle stitching apparatus 110 saddle-stitches sheets printed by the printing apparatus 100.

In the use of the paper folding apparatus 107, case binding apparatus 108, cutting apparatus 109, and saddle stitching apparatus 110, the user takes out sheets printed by the printing apparatus 100 from the printing system 1000, sets them in an apparatus for use, and causes the apparatus to process them. A plurality of apparatuses in the POD system 10000 of FIG. 1 except for the saddle stitching apparatus 110 are connected to the network 101 so as to communicate data with each other.

Sheet processing apparatuses are classified into three categories "inline finisher", "near-line finisher", and "offline finisher", and defined as follows. The "inline finisher" is defined as a sheet processing apparatus which satisfies both (condition 1) and (condition 2) listed below. The "near-line finisher" is defined as a sheet processing apparatus which satisfies only (condition 2). The "offline finisher" is defined as a sheet processing apparatus which satisfies neither (condition 1) nor (condition 2).

(Condition 1) The paper path (sheet feeding path) is physically connected to the printing apparatus 100 so as to directly receive sheets conveyed from the printing apparatus 100 without any operator intervention.

(Condition 2) A sheet processing apparatus is electrically connected to another apparatus so as to communicate data necessary for an operation instruction, status confirmation, or the like with another apparatus. More specifically, a sheet processing apparatus is electrically connected to the printing apparatus 100 so as to communicate data with it, or electrically connected to an apparatus (e.g., the PC 103 or 104) other than the printing apparatus 100 via the network 101 so as to communicate data with the apparatus. A sheet processing apparatus which satisfies either condition meets (condition 2).

That is, the sheet processing apparatus 200 corresponds to an "inline finisher". The paper folding apparatus 107, case binding apparatus 108, and cutting apparatus 109 correspond to "near-line finishers". The saddle stitching apparatus 110 corresponds to an "offline finisher".

The configuration of the printing system 1000 will be explained with reference to the system block diagram of FIG. 2.

Figure 2:
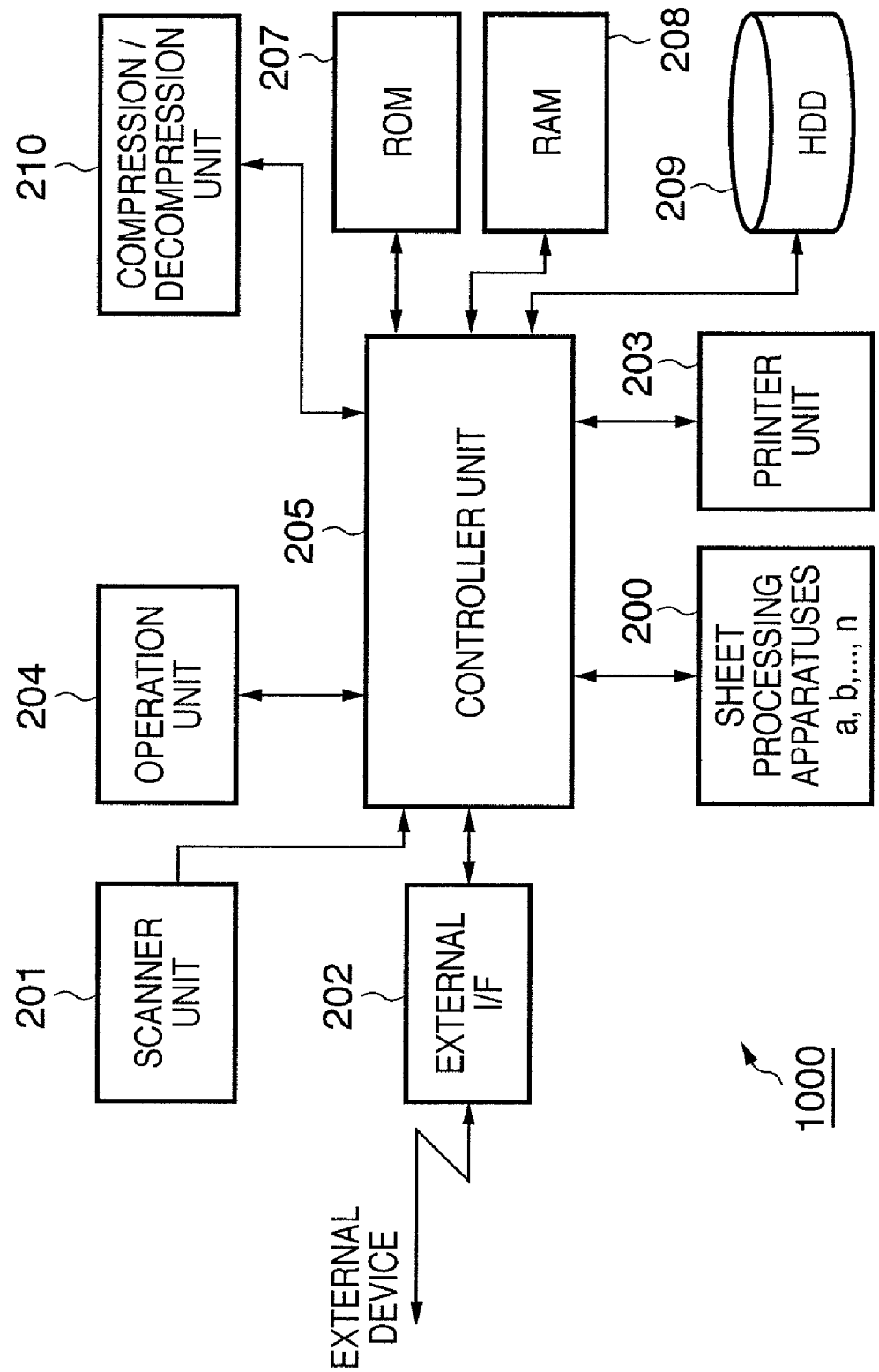
FIG. 2 is a block diagram for explaining a configuration of the printing system 1000 to be controlled.

The printing apparatus 100 incorporates units shown in FIG. 2 in the printing system 1000 except for the sheet processing apparatus 200. An arbitrary number of sheet processing apparatuses 200 are connectable to the printing apparatus 100.

The printing system 1000 is configured so that the sheet processing apparatus 200 connected to the printing apparatus 100 can execute sheet processing for sheets printed by the printing apparatus 100. It is also possible to form the printing system 1000 from only the printing apparatus 100 without connecting the sheet processing apparatus 200. The sheet processing apparatus 200 can communicate with the printing apparatus 100, and execute sheet processing (to be described later) upon receiving an instruction from the printing apparatus 100.

In the printing apparatus 100, a scanner unit 201 scans an image on a document, converts the image into image data, and transfers the image data to another unit. An external I/F 202 exchanges data with other apparatuses connected to the network 101. A printer unit 203 forms an image based on input image data, and prints it on a sheet. An operation unit 204 has a hard key input unit and touch panel, from which instructions from the user are accepted. The operation unit 204 provides various displays on its touch panel.

A control (controller) unit 205 comprehensively controls the processes and operations of various units in the printing system 1000. The control unit 205 also controls the operation of the printing apparatus 100 and that of the sheet processing apparatus 200 connected to the printing apparatus 100. A ROM 207 stores various programs to be executed by the control unit 205. For example, the ROM 207 stores programs to execute various processes of flowcharts to be described later, and display control programs to display various setup images to be described later. The ROM 207 further stores a program to cause the control unit 205 to interpret PDL (Page Description Language) code data received from the PC 103, PC 104, or the like and rasterize the PDL code data into raster image data. In addition, the ROM 207 stores a boot sequence, font information, and the like.

A RAM 208 stores image data sent from the scanner unit 201 and external I/F 202, various programs stored in the ROM 207, and setting information. The RAM 208 also stores information on the sheet processing apparatus 200 (e.g., information on the number of (0 to n) sheet processing apparatuses 200 connected to the printing apparatus 100, information on the function of each sheet processing apparatus, or the connection order of the sheet processing apparatuses).

An HDD (Hard Disk Drive) 209 includes a hard disk, and a drive unit which reads/writes data from/to the hard disk. The HDD 209 is a large-capacity storage device which stores image data input from the scanner unit 201 and external I/F 202 and compressed by a compression/decompression unit 210. The control unit 205 instructs the printer unit 203 to print image data stored in the HDD 209 based on an instruction from the user. The control unit 205 transmits image data stored in the HDD 209 to an external apparatus such as the PC 103 via the external I/F 202 based on an instruction from the user.

The compression/decompression unit 210 compresses/decompresses image data and the like stored in the RAM 208 and HDD 209 in accordance with various compression schemes such as JBIG and JPEG.

Figure 3:
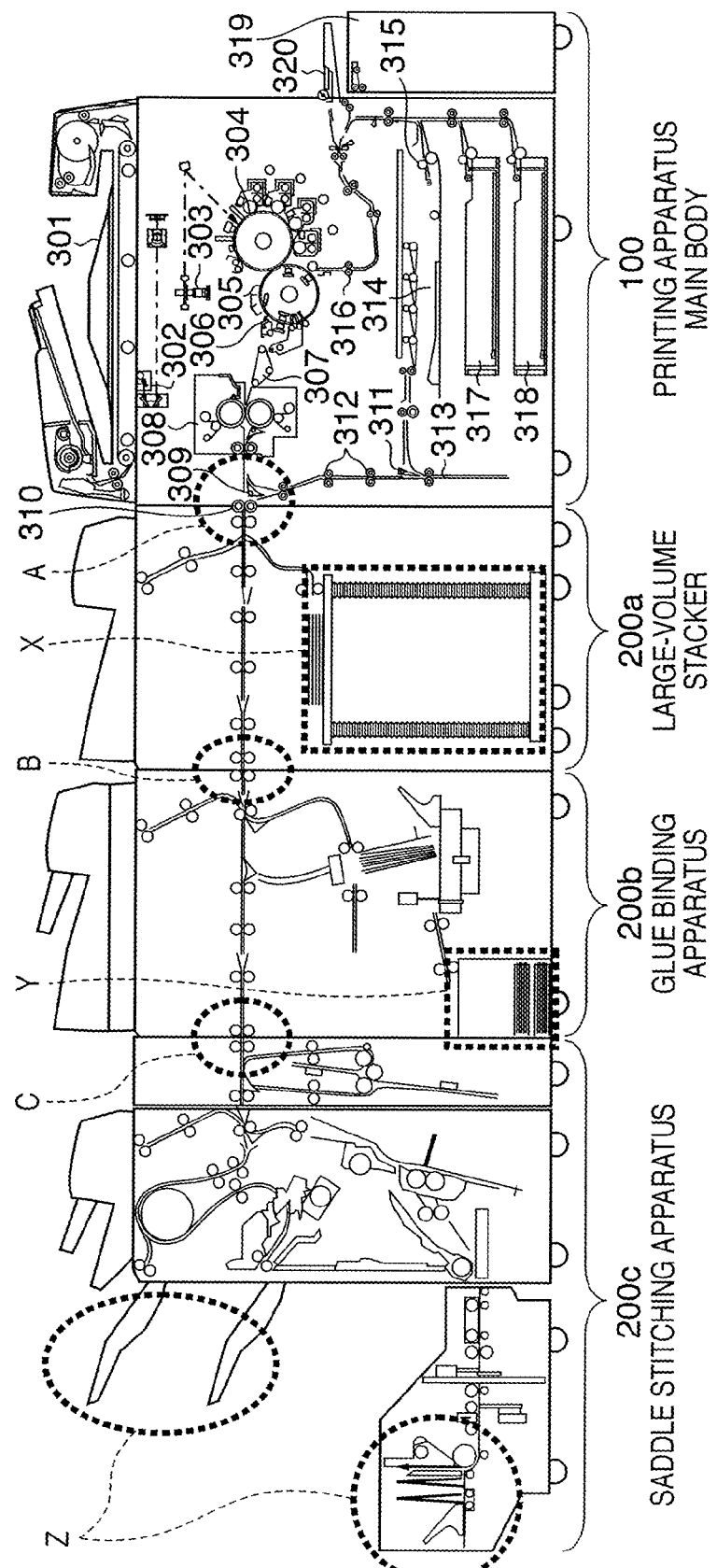
FIG. 3 is a side sectional view showing an internal configuration of the printing system 1000.

The configuration of the printing system 1000 will be explained with reference to FIG. 3. FIG. 3 is a side sectional view showing an internal configuration of the printing system 1000. The printing system 1000 is made up of the printing apparatus 100 and the sheet processing apparatus 200 connected to it.

The structure of the printing apparatus 100 will be explained first. An auto document feeder (ADF) 301 separates a document bundle on the support surface of the document tray sequentially in the order of pages from the first document sheet, and feeds each document sheet to the glass document table in order to scan the document sheet by a scanner 302.

The scanner 302 scans the image of the document sheet fed onto the glass document table, and converts the image into image data by a CCD. A rotary polygon mirror 303 receives a light ray (e.g., a laser beam) modulated in accordance with the image data, and irradiates a photosensitive drum 304 with the light ray as a reflected scan beam via a reflecting mirror. A latent image formed by the laser beam on the photosensitive drum 304 is developed with toner, and the toner image is transferred onto a sheet material on a transfer drum 305. A series of image forming processes is executed sequentially with yellow (Y), magenta (M), cyan (C), and black (K) toners, forming a full-color image. After four image forming processes, the sheet material bearing the full-color image is separated by a separation gripper 306 from the transfer drum 305, and conveyed to a fixing unit 308 by a pre-fixing conveyor 307. The fixing unit 308 has a combination of rollers and belts, and incorporates a heat source such as a halogen heater. The fixing unit 308 fuses and fixes, by heat and pressure, toner on a sheet material bearing a toner image. A delivery flapper 309 is swingable about the swing shaft, and regulates the sheet material conveyance direction. When the delivery flapper 309 swings clockwise in FIG. 3, a sheet material is conveyed straight, and discharged outside the apparatus by delivery rollers 310. The control unit 205 controls the printing apparatus 100 to execute single-sided printing according to this sequence.

To form images on the two surfaces of a sheet material, the delivery flapper 309 swings counterclockwise in FIG. 3, and the course of the sheet material changes to the downward direction to supply the sheet material to the double-sided conveyance section. The double-sided conveyance section has a reverse flapper 311, reverse rollers 312, a reverse guide 313, and a double-sided tray 314. The reverse flapper 311 swings about the swing shaft, and regulates the sheet material conveyance direction. To process a double-sided print job, the control unit 205 controls to swing the reverse flapper 311 counterclockwise in FIG. 3 to supply a sheet having the first surface printed by the printer unit 203 to the reverse guide 313 via the reverse rollers 312. While the reverse rollers 312 clamp the trailing end of the sheet material, the reverse rollers 312 temporarily stop, the reverse flapper 311 swings clockwise in FIG. 3, and the reverse rollers 312 rotate backward. The sheet is switched back to replace its trailing and leading ends, and then the sheet is guided to the double-sided tray 314. The double-sided tray 314 temporarily supports the sheet material, and a refeed roller 315 supplies the sheet material again to registration rollers 316. At this time, the sheet material is sent while a surface opposite to the first surface in the transfer process faces the photosensitive drum. The second image is formed on the second surface of the sheet by the same process as that described above. After the images are formed on the two surfaces of the sheet material, the sheet undergoes the fixing process and is discharged outside from the printing apparatus main body via the delivery rollers 310. The control unit 205 controls the printing apparatus 100 to execute double-sided printing according to this sequence.

The printing apparatus 100 comprises a paper feed section which stores sheets necessary for print processing. The paper feed section has paper feed cassettes 317 and 318 (each capable of storing, e.g., 500 sheets), a paper feed deck 319 (capable of storing, e.g., 5,000 sheets), and a manual feed tray 320. The paper feed cassettes 317 and 318 and the paper deck 319 allow setting sheets of different sizes and materials discriminatively in the respective paper feed units. The manual feed tray 320 also allows setting various sheets including a special sheet such as an OHP sheet. The paper feed cassettes 317 and 318, the paper deck 319, and the manual feed tray 320 respectively have paper feed rollers, which successively feed sheets one by one.

The sheet processing apparatuses 200 will be explained. Note that an arbitrary number of (maximum of five) sheet processing apparatuses 200 of arbitrary types are connectable as long as they can convey a sheet from an upstream apparatus to a downstream apparatus via the sheet feeding path. For example, a large-volume stacker 200a, glue binding apparatus 200b, and saddle stitching apparatus 200c are connected in the order named closer from the printing apparatus 100, and selectively available in the printing system 1000. Each sheet processing apparatus 200 has a sheet discharge portion, and the user can take out a processed sheet from the sheet discharge portion of the sheet processing apparatus.

The control unit 205 accepts, together with a print execution request via the operation unit 204, a request to execute sheet processing of a type desired by the user among sheet processing candidates of types executable by the sheet processing apparatuses 200 connected to the printing apparatus 100. Upon accepting a print execution request for a target job from the user via the operation unit 204, the control unit 205 causes the printer unit 203 to execute print processing necessary for the job. The control unit 205 controls to convey printed sheets of the job via the sheet feeding path to a sheet processing apparatus capable of executing sheet processing desired by the user. Then, the control unit 205 causes the sheet processing apparatus to execute the sheet processing.

Assume that a target job whose print execution request is accepted from the user requires large-volume stacking processing by the large-volume stacker 200a when the printing system 1000 has a system configuration shown in FIG. 3. This job is called a "stacker job".

When processing the stacker job in the system configuration of FIG. 3, the control unit 205 controls to convey sheets of the job printed by the printing apparatus 100 into the large-volume stacker via point A in FIG. 3. Then, the control unit 205 causes the large-volume stacker 200a to stack the sheets of the job. The control unit 205 causes the large-volume stacker 200a to hold the printed materials of the job stacked in the large-volume stacker 200a at delivery destination X inside the large-volume stacker 200a without conveying them to another apparatus (e.g., a succeeding apparatus).

The user can directly take out, from delivery destination X, the printed materials of the stacker job held at delivery destination X in FIG. 3. This can omit a series of apparatus operations and user operations to convey sheets to the most downstream delivery destination Z in the sheet conveyance direction in FIG. 3 and take out the printed materials of the stacker job from delivery destination Z.

Assume that a target job whose print execution request is accepted from the user requires sheet processing (e.g., glue binding of case binding or pad binding) by the glue binding apparatus 200b in the system configuration of FIG. 3. This job is called a "glue binding job".

When processing the glue binding job in the system configuration of FIG. 3, the control unit 205 controls to convey sheets printed by the printing apparatus 100 into the glue binding apparatus 200b via points A and B in FIG. 3. Then, the control unit 205 causes the glue binding apparatus 200b to bind the sheets of the job with glue. The control unit 205 causes the glue binding apparatus 200b to hold the printed materials of the job glue-bound by the glue binding apparatus 200b at delivery destination Y inside the glue binding apparatus 200b without conveying them to another apparatus (e.g., a succeeding apparatus).

Assume that a target job whose print execution request is accepted from the user requires sheet processing by the saddle stitching apparatus 200c in the system configuration of FIG. 3. The sheet processing by the saddle stitching apparatus 200c includes, for example, saddle stitching, punching, cutting, shift delivery, and folding. This job is called a "saddle stitching job".

When processing the saddle stitching job by the system configuration in FIG. 3, the control unit 205 controls to convey sheets of the job printed by the printing apparatus 100 into the saddle stitching apparatus 200c via points A, B, and C. Then, the control unit 205 causes the saddle stitching apparatus 200c to process the sheets of the job. The control unit 205 causes the saddle stitching apparatus 200c to hold the printed materials of the saddle stitching job at delivery destination Z in the saddle stitching apparatus 200c.

Delivery destination Z has a plurality of delivery destination candidates. This is because the saddle stitching apparatus can execute a plurality of types of sheet processes and the delivery destination changes in each sheet processing.

As described with reference to FIGS. 1 to 3, the printing system 1000 according to the embodiment allows connecting a plurality of sheet processing apparatuses to the printing apparatus 100. These sheet processing apparatuses can be arbitrarily combined and connected to the printing apparatus 100. The connection order of the sheet processing apparatuses can be freely changed as long as the sheet feeding paths of the sheet processing apparatuses link with each other. There is a plurality of types of sheet processing apparatus candidates connectable to the printing apparatus 100.

The internal structures of the sheet processing apparatuses connectable to the printing apparatus 100 will be explained for each type with reference to FIGS. 4 to 6.

The internal structure of the large-volume stacker will be explained with reference to the sectional view shown in FIG. 4. The large-volume stacker conveys a sheet from an upstream apparatus selectively to one of three feeding paths (escape path, stack path, and straight path).

The stack path in the large-volume stacker is a sheet feeding path for conveying sheets to the stack tray. The stack tray in FIG. 4 is a stacking unit mounted on an extensible stay. A demountable dolly supports the extensible stay from below it. With the dolly, the operator can carry sheets stacked on the stack tray.

Assume that the control unit 205 accepts a request from the user via the operation unit 204 to execute a job set to perform sheet stacking processing by the large-volume stacker. In this case, the control unit 205 conveys sheets printed by the printing apparatus 100 to the stack path of the large-volume stacker, and delivers them to the stack tray via the stack path.

Figure 4:
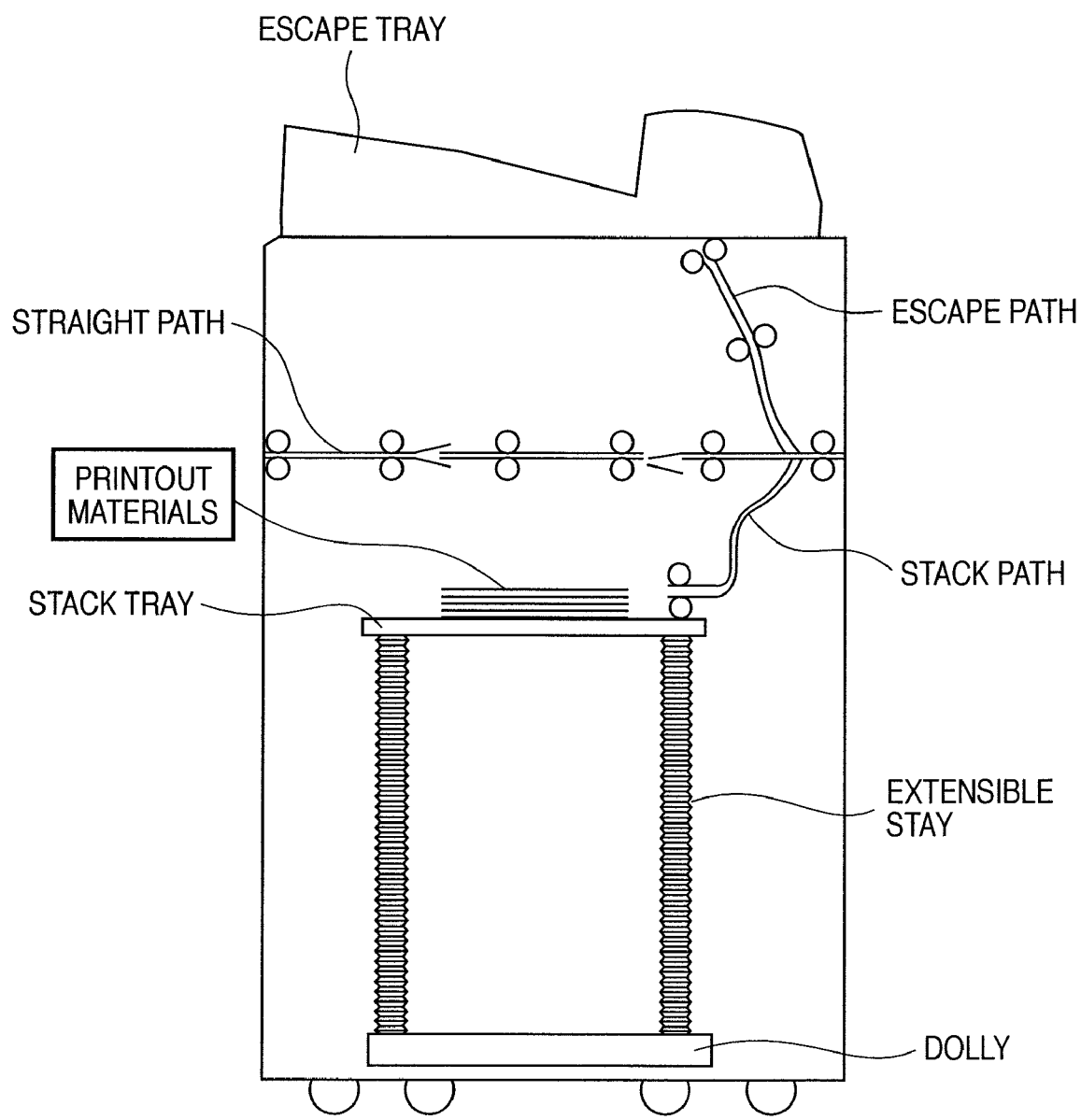
FIG. 4 is a side sectional view showing an internal structure of a large-volume stacker.

The straight path of the large-volume stacker shown in FIG. 4 is a sheet feeding path for conveying, to a succeeding apparatus, sheets of a job requiring no sheet stacking processing using the stack tray of the large-volume stacker.

The escape path is a sheet feeding path for discharging sheets to the escape tray (also called a sample tray). The escape path is used to output sheets without stacking them. For example, when confirming outputs (proof print), printed materials are conveyed to the escape path and can be taken out from the escape tray.

A plurality of sheet sensors necessary to detect the sheet conveyance status and paper jams is arranged on the sheet feeding path in the large-volume stacker.

The large-volume stacker comprises a CPU (not shown), and the CPU notifies the control unit 205 of sheet detection information from each sensor via a signal line for data communication. Based on the information from the large-volume stacker, the control unit 205 grasps the sheet conveyance status and paper jams in the large-volume stacker. When another sheet processing apparatus is connected between the large-volume stacker and the printing apparatus 100, the CPU (not shown) of the sheet processing apparatus notifies the control unit 205 of sensor information of the large-volume stacker.

The internal structure of the glue binding apparatus will be explained with reference to the sectional view shown in FIG. 5. The glue binding apparatus conveys a sheet from an upstream apparatus selectively to one of three feeding paths (cover path, main body path, and straight path).

The glue binding apparatus also has an inserter path. The inserter path is a sheet feeding path for conveying a sheet on the insertion tray to the cover path.

The straight path of the glue binding apparatus in FIG. 5 is a sheet feeding path for conveying, to a succeeding apparatus, sheets of a job requiring no glue binding by the glue binding apparatus.

The main body path and cover path of the glue binding apparatus shown in FIG. 5 are sheet feeding paths for conveying sheets necessary to create case-bound printed materials.

For example, when creating case-bound printed materials using the glue binding apparatus, the control unit 205 causes the printer unit 203 to print image data of the body on sheets serving as the body of the case-bound printed materials. Case-bound printed materials of one booklet are created by wrapping a bundle of body sheets for one booklet with one cover. The body sheet bundle in case binding will be called a "main body".

The control unit 205 controls to convey sheets printed by the printing apparatus 100 to the main body path shown in FIG. 5. In case binding, the control unit 205 causes the glue binding apparatus to wrap the main body printed by the printing apparatus 100 with a cover sheet conveyed via the cover path.

For example, the control unit 205 causes the glue binding apparatus to sequentially stack main body sheets conveyed from an upstream apparatus on the stacking unit via the main body path in FIG. 5. After stacking sheets bearing body data on the stacking unit by the number of sheets of one booklet, the control unit 205 controls to convey one cover sheet necessary for the job via the cover path. The control unit 205 controls a gluing unit in FIG. 5 to glue the spine of the sheet bundle of one set corresponding to the main body. Then, the control unit 205 controls the gluing unit to bond the spine of the main body to the center of the cover. In bonding the main body to the cover, the main body is conveyed and pushed down in the apparatus. As a result, the cover is folded to wrap the main body with one cover. The sheet bundle of one set is stacked on a rotating table in FIG. 5 along the guide.

After the sheet bundle of one set is set on the rotating table in FIG. 5, the control unit 205 causes a cutter in FIG. 5 to cut the sheet bundle. At this time, the cutter can execute three-side cutting processing to cut three edges of the sheet bundle of one set other than an edge serving as the spine. The control unit 205 uses an aligning unit to push the sheet bundle having undergone three-side cutting processing toward a basket, putting the sheet bundle into the basket in FIG. 5.

The internal structure of the saddle stitching apparatus will be explained with reference to the sectional view shown in FIG. 6. The saddle stitching apparatus comprises various units for selectively executing stapling, cutting, punching, folding, shift delivery, saddle stitching, and the like for sheets from the printing apparatus 100. The saddle stitching apparatus does not have a straight path for conveying sheets to a succeeding apparatus. For this reason, the saddle stitching apparatus is connected last, as shown in FIG. 3, when connecting a plurality of sheet processing apparatuses to the printing apparatus 100.

Figure 6:
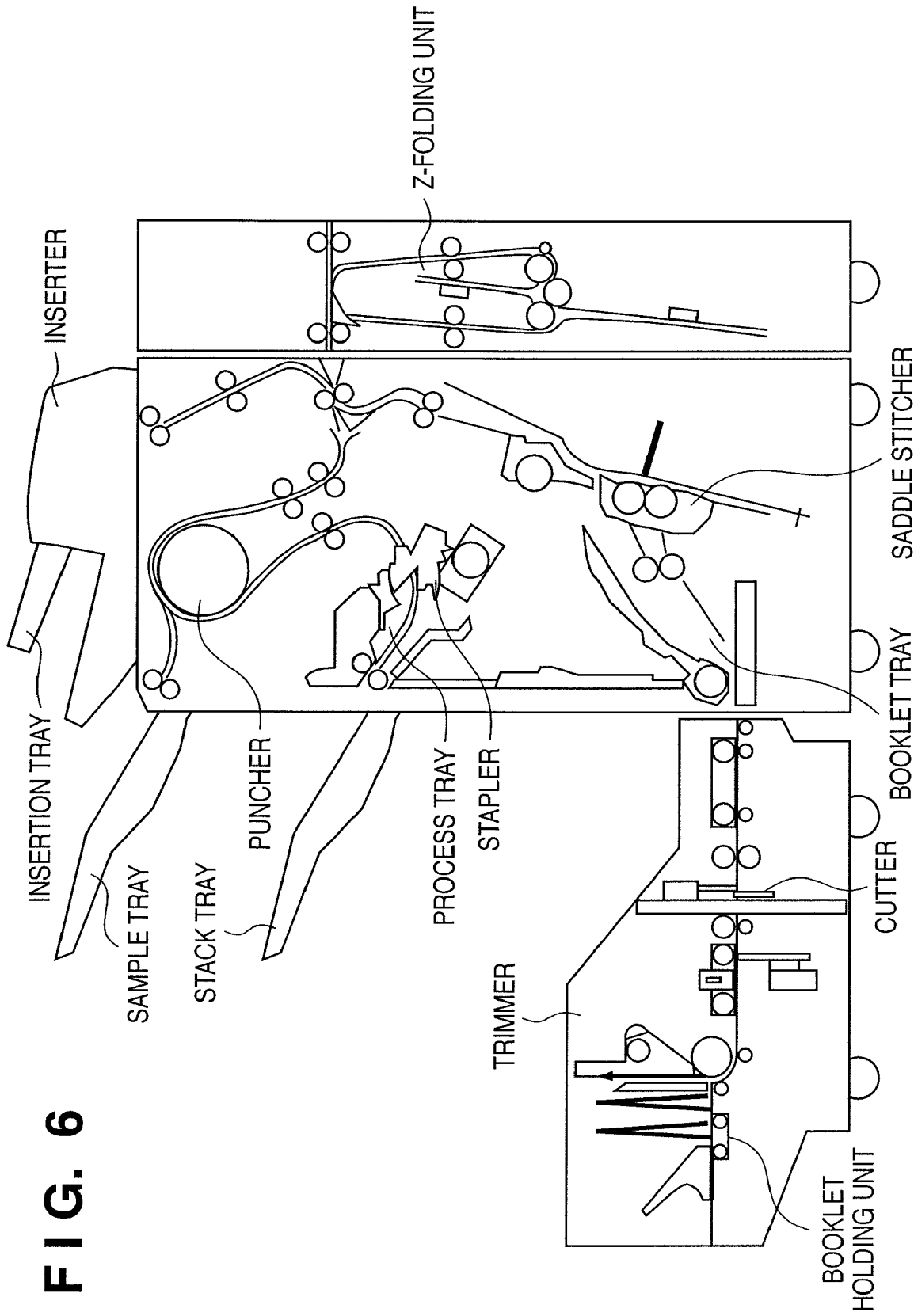
FIG. 6 is a side sectional view showing an internal structure of a saddle stitching apparatus.

As shown in FIG. 6, the saddle stitching apparatus has a sample tray and stack tray outside the apparatus, and a booklet tray inside the apparatus.

Upon accepting an instruction to staple sheets by the saddle stitching apparatus, the control unit 205 causes the saddle stitching apparatus to sequentially stack sheets printed by the printing apparatus 100 on the process tray inside the saddle stitching apparatus. After stacking sheets of one bundle on the process tray, the control unit 205 causes a stapler to staple them. The control unit 205 causes the saddle stitching apparatus to discharge the stapled sheet bundle from the process tray to the stack tray in FIG. 6.

When executing a job for which the control unit 205 accepts an instruction to Z-fold sheets by the saddle stitching apparatus, the control unit 205 causes a Z-folding unit to Z-fold sheets printed by the printing apparatus 100. The control unit 205 controls to make the folded sheets pass through the saddle stitching apparatus and deliver them to a discharge tray such as the stack tray or sample tray.

Upon accepting an instruction to perform punching by the saddle stitching apparatus, the control unit 205 causes a puncher to punch sheets printed by the printing apparatus 100. The control unit 205 controls to make the punched sheets pass through the saddle stitching apparatus and deliver them onto a discharge tray such as the stack tray or sample tray.

When executing a job for which the control unit 205 accepts an instruction to saddle-stitch sheets by the saddle stitching apparatus, the control unit 205 causes a saddle stitcher to stitch a bundle of sheets by one set at two center portions. The control unit 205 causes the saddle stitcher to clamp the sheet bundle at the center by rollers and fold the sheets into two at the center, thereby creating a booklet such as a brochure. The sheet bundle saddle-stitched by the saddle stitcher is conveyed onto the booklet tray.

Upon accepting a cutting instruction for a job for which the control unit 205 accepts an instruction to saddle-stitch sheets, the control unit 205 controls to convey a saddle-stitched sheet bundle from the booklet tray to a trimmer. The control unit 205 causes a cutter to cut the sheet bundle conveyed to the trimmer, and a booklet holding unit to hold the sheet bundle. The saddle stitching apparatus in FIG. 6 can also cut three edges of a saddle-stitched sheet bundle.

When the saddle stitching apparatus does not have any trimmer, the operator can take out a sheet bundle bound by the saddle stitcher from the booklet tray.

The saddle stitching apparatus can also attach a sheet (e.g., a cover sheet printed in advance) set on the insertion tray in FIG. 6 to a sheet printed by the printing apparatus 100 and conveyed from it.

Figure 7:
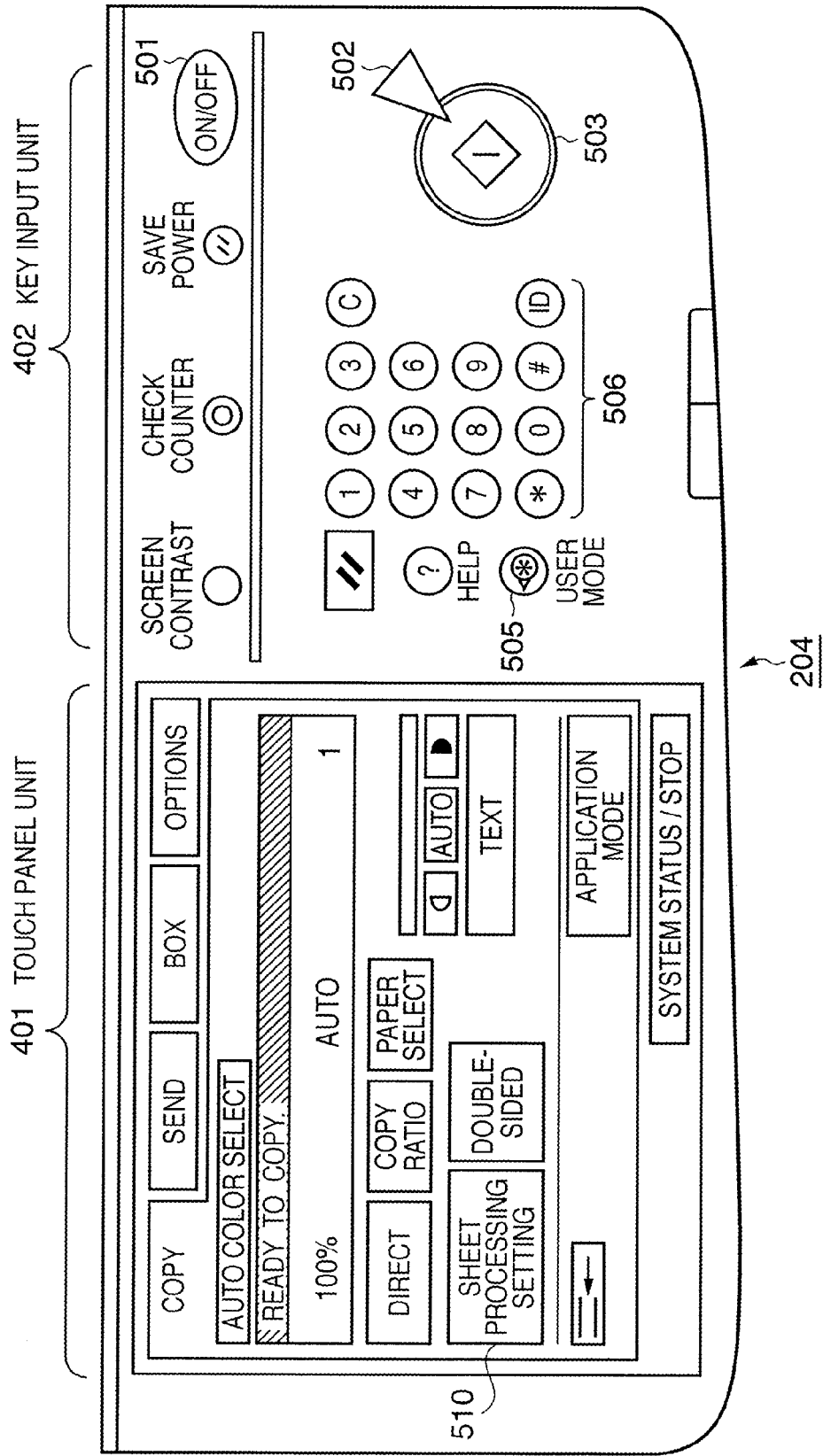
FIG. 7 is a view showing an arrangement of an operation unit 204.

The arrangement of the operation unit 204 will be described with reference to FIG. 7. The operation unit 204 comprises a touch panel unit 401 and key input unit 402. The touch panel unit 401 is formed from an LCD (Liquid Crystal Display) and a transparent electrode adhered onto the LCD, and displays various setup windows for accepting an instruction from the user. The touch panel unit 401 has both a function of displaying various windows and an instruction input function of accepting an instruction from the user. The key input unit 402 comprises a power key 501, start key 503, stop key 502, user mode key 505, and numerical keypad 506. The start key 503 is used to cause the printing apparatus 100 to start a copy job and send job. The numerical keypad 506 is used to set a numerical value such as the number of copies.

The control unit 205 controls the printing system 1000 to perform various processes based on user instructions accepted via various windows displayed on the touch panel unit 401 and user instructions accepted via the key input unit 402.

Figure 8:
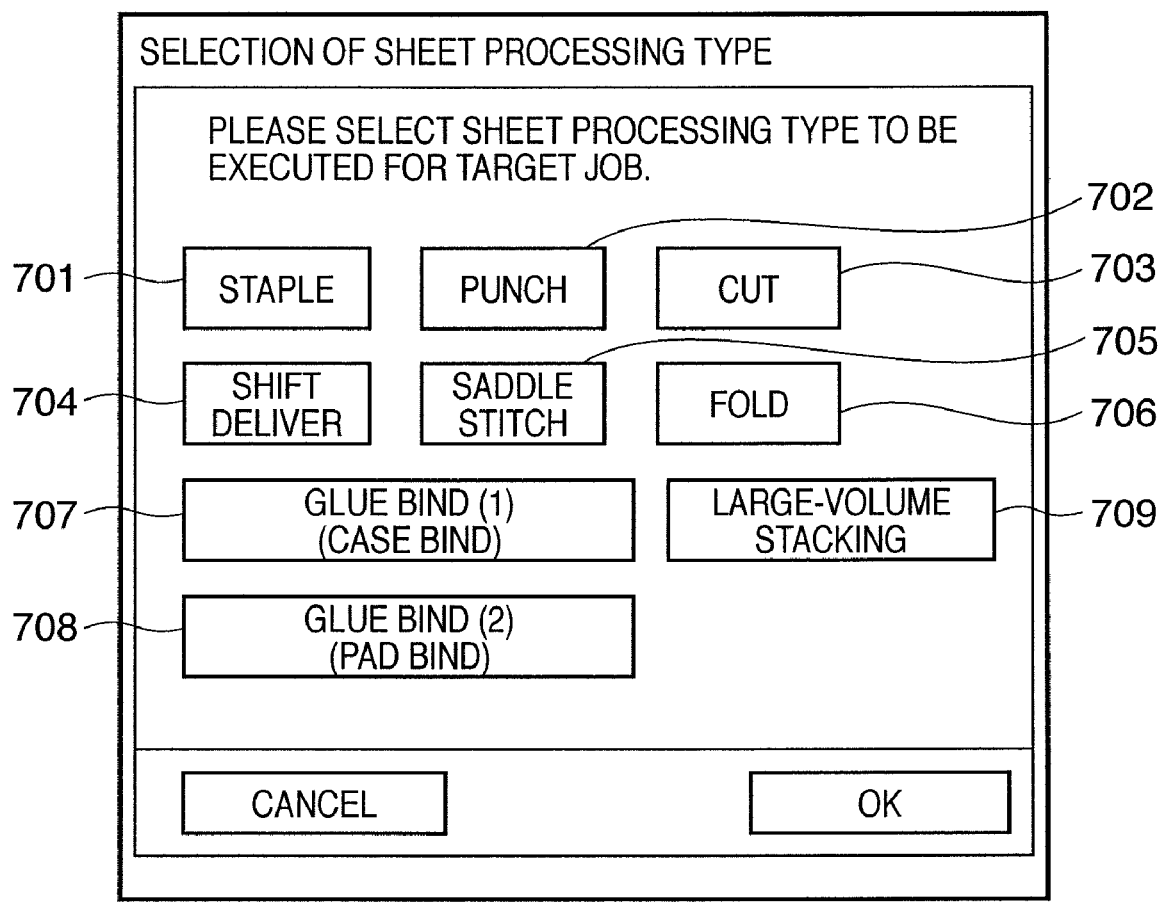
FIG. 8 is a view showing an example of a window to select a sheet processing type.

FIG. 8 shows a setup window 700 for prompting the user to select the type of sheet processing to be executed for sheets printed by the printing apparatus 100. When the user presses a sheet processing setting key 510 in FIG. 7 displayed in the window on the touch panel unit 401, the control unit 205 causes the touch panel unit 401 to display the window in FIG. 8. This window is a setup window which allows the user to select the type of sheet processing executable by the sheet processing apparatus 200 present in the printing system 1000. For example, the user can select staple 701, punch 702, cut 703, shift delivery 704, saddle stitch 705, fold 706, glue bind (case bind) 707, glue bind (pad bind) 708, and large-volume stacking 709. The control unit 205 accepts, from the user via this setup window, settings of sheet processing to be executed for a target job, and causes the sheet processing apparatus 200 to execute the sheet processing according to the settings.

A window shown in FIG. 9 is a setup window which allows the user to register information for specifying the number, types, and connection order of sheet processing apparatuses when the sheet processing apparatuses 200 are connected to the printing apparatus 100. When the user presses the user mode key 505, the control unit 205 causes the touch panel unit 401 to display the window shown in FIG. 9.

For example, when the printing system 1000 has the system configuration as shown in FIG. 3, the user sets, in the window of FIG. 9, registration information that three sheet processing apparatuses, that is, the large-volume stacker, glue binding apparatus, and saddle stitching apparatus are connected to the printing apparatus 100 sequentially from the large-volume stacker. The control unit 205 causes the RAM 208 to hold, as system configuration information, the information on the sheet processing apparatuses 200 that is set by the user via the window in FIG. 9. The control unit 205 properly reads out and refers to the system configuration information. From the system configuration information, the control unit 205 confirms the number and connection order of sheet processing apparatuses connected to the printing apparatus 100, and sheet processing types executable by the sheet processing apparatuses.

When the user makes a setting in the window of FIG. 9 to connect the saddle stitching apparatus having no straight path between sheet processing apparatuses, the control unit 205 causes the touch panel unit 401 to present an error display in order to invalidate the setting. Further, as shown in FIG. 9, the control unit 205 causes the touch panel unit 401 to display guidance information and notify the user of cancellation of this setting and connection of the saddle stitching apparatus last.

The embodiment exemplifies the operation unit 204 of the printing apparatus 100 as an example of a user interface unit applied to the printing system 1000, but another user interface unit is also available. For example, the printing system 1000 is configured to be able to execute processing based on an instruction from the user interface unit of an external apparatus such as the PC 103 or PC 104.

Figure 10:
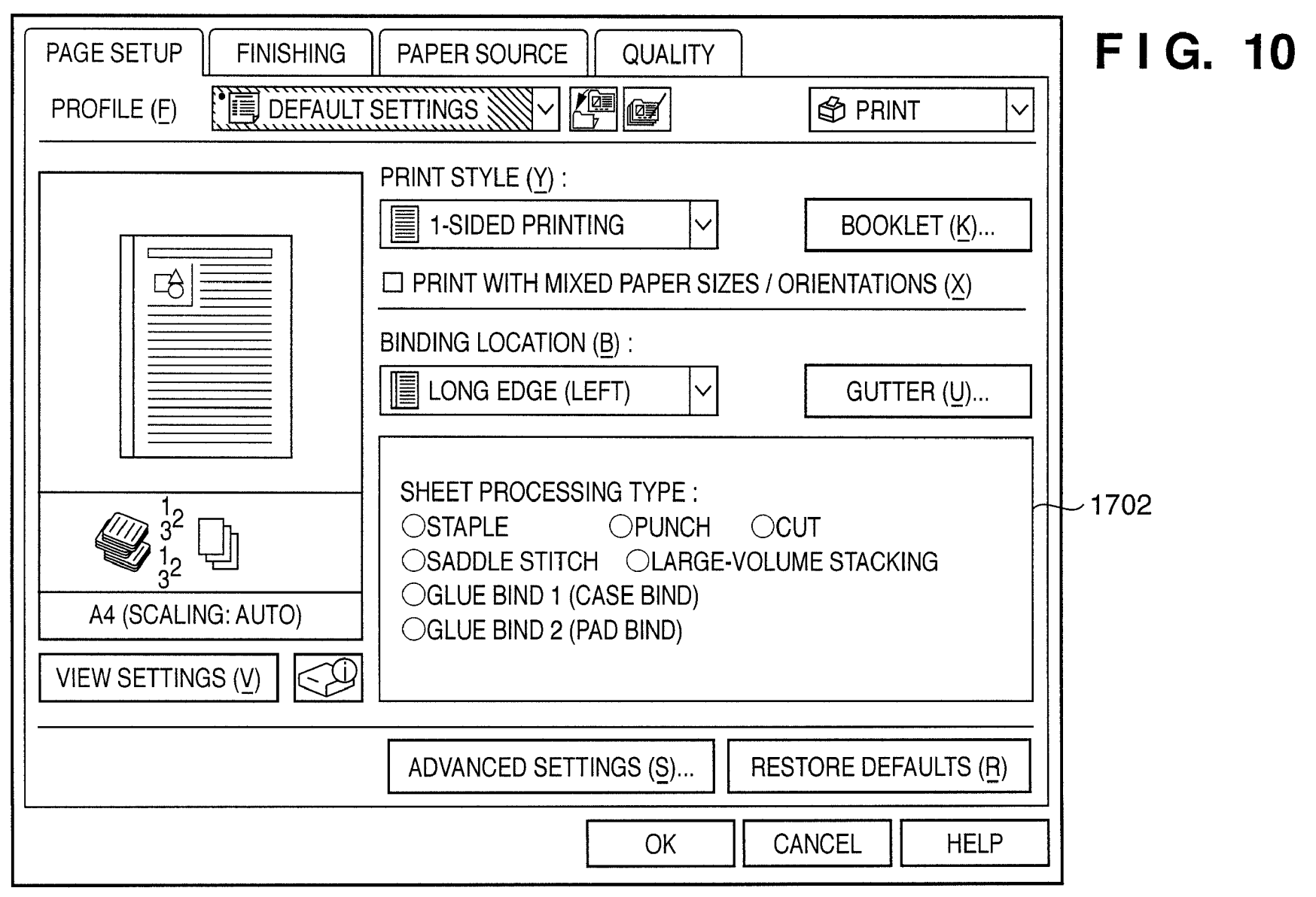

When the external apparatus remote-controls the printing system 1000, the display unit of the external apparatus displays a setup window relevant to the printing system 1000, as shown in FIG. 10. This will be exemplified using the PC 104. FIG. 10 shows an example of a window on the display of the PC 104.

Upon accepting a print request from the user, the CPU of the PC 104 causes the display to present the window as shown in FIG. 10. The CPU accepts the settings of print processing conditions from the user of the PC 104 via the window. For example, the CPU of the PC 104 accepts, from the user via a setting field 1702, the type of sheet processing to be executed by the sheet processing apparatus 200 for a print job for which the PC 104 issues a print execution request. Upon accepting the print execution request in response to the pressing of an OK key shown in FIG. 10, the CPU of the PC 104 associates the print processing conditions accepted via the window with image data to be printed. The CPU of the PC 104 controls to transmit the resultant data as one job to the printing system 1000 via the network 101.

In the printing system 1000, upon accepting the print execution request of the job via the external I/F 202, the control unit 205 controls the printing system 1000 to process the job from the PC 104 based on the print processing conditions from the PC 104.

[Operation Method Associated with Suspension of Job]

In the printing system 1000, the control unit 205 receives a PDL job, copy job, or the like as a job to be printed, and temporarily saves the received job in the HDD 209. The PDL job is a job whose PDL data received from an external device via the external I/F 202 is interpreted and rasterized into raster data, which is printed. The copy job is a job whose document image data scanned by the scanner unit 201 is converted into printable data, which is printed, upon receiving an instruction from the user or operator via the operation unit 204.

After saving such jobs in the HDD 209, the control unit 205 stores them in the print queue in their acceptance order. The control unit 205 sequentially prints out the temporarily saved jobs while monitoring the statuses of the printer unit 203 and sheet processing apparatus 200.

Figure 12:
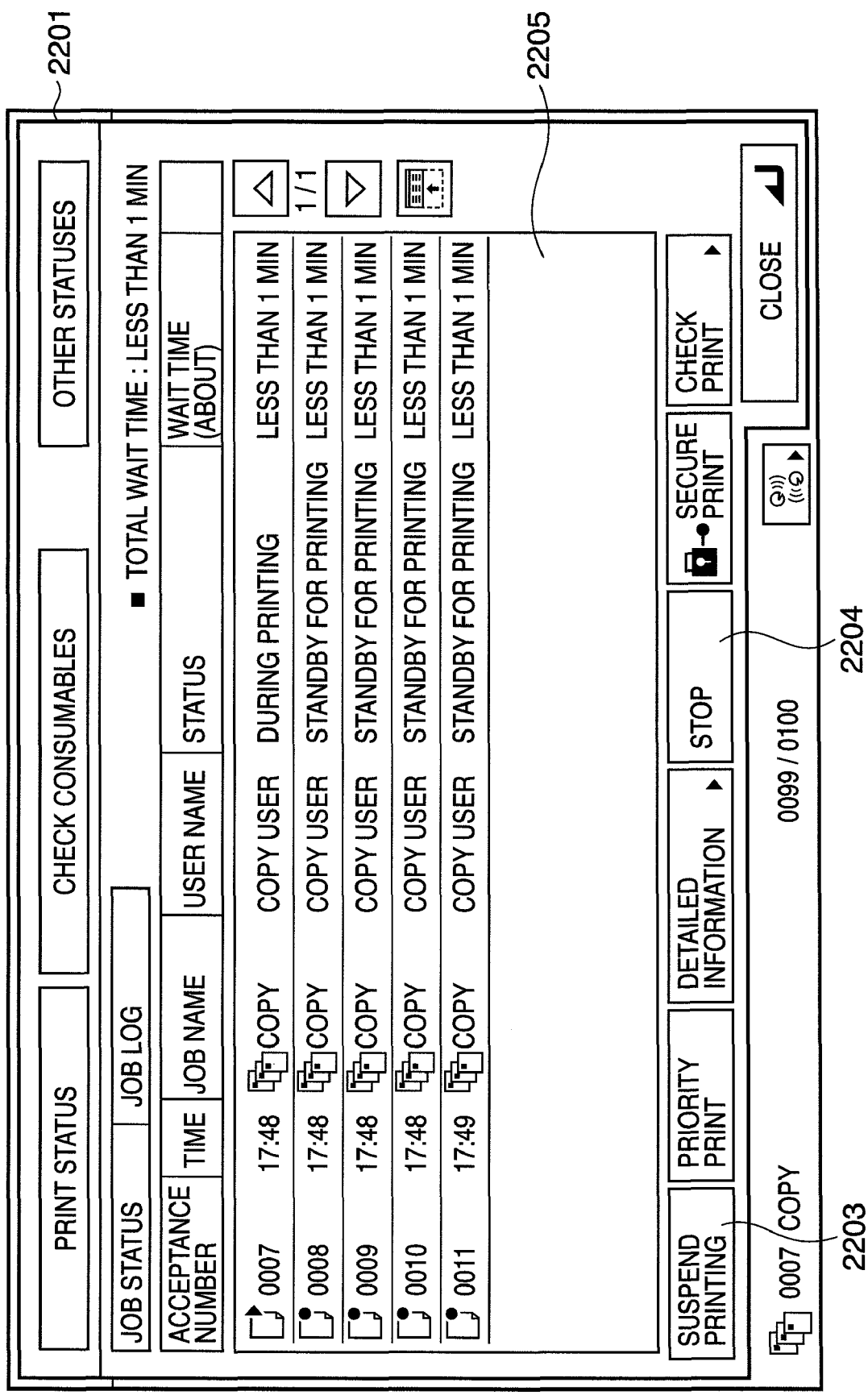
FIG. 12 is a view showing an example of a job status window in the embodiment.

At this time, the control unit 205 stores jobs in the print queue. At the same time, the control unit 205 updates, e.g., print queue management information 2100 shown in FIG. 11, and manages the print queue state. Also, the control unit 205 updates the operation unit 204 to display a job status window 2201 shown in FIG. 12 representing the processing status of a job.

The control unit 205 deletes, from the print queue, a printout job or a job for which the user or operator explicitly stops printout. Then, the control unit 205 starts printing of the next job. At the same time, the control unit 205 deletes the information from the print queue management information 2100, and updates the window display.

As shown in FIG. 11, the print queue management information 2100 has a job number 2101 uniquely assigned to a job by the control unit 205 in the print queue registration order. While a job exists in the print queue, the control unit 205 handles the job using the job number as a key. The print queue management information 2100 also manages a reception time 2102 and job type 2103 as information accessory to the job number 2101. As accessory information, the print queue management information 2100 may also have the name of a job, the name of a user who requests a job, the number of pages of a job, and the number of copies. However, these elements are not indispensable to the embodiment and are not illustrated.

The print queue management information 2100 further has processing condition designation information on various processing conditions which are designated from the PC 103 or operation unit 204 and acquired when the control unit 205 accepts a job. The control unit 205 acquires processing condition designation information using an information exchange tool such as JDF, and stores it in the print queue management information 2100. In the embodiment, processing condition designation information corresponds to finishing designation 2104, color/monochrome 2105, and paper 2106.

These pieces of processing condition designation information are not inconsistent with information representing the configuration of the printing apparatus 100 in the embodiment. This is because conditions which can be designated have already been determined on the basis of the configuration information when the user or operator designates processing conditions. For example, the user or operator cannot designate the use of a sheet processing apparatus which is neither physically nor electrically connected to the printing system 1000. Hence, the finishing designation 2104 does not contain a finishing by such a sheet processing apparatus.

The print queue management information 2100 also has information on a job status 2107 and information on a job standby reason 2108. Control of the job status information will be described later.

An operation to a job stored in the print queue will be further explained. The control unit 205 controls to suspend or stop a job stored in the print queue in accordance with an operation by the user or operator. The user can designate a specific job in a job status list 2205 by a touch panel operation to the operation unit 204, and press a print suspension button 2203 or stop button 2204 to perform a designated job operation.

At this time, the control unit 205 specifies a job number from the job status list 2205 in accordance with a job designated by the user. In response to press of the suspension button 2203 or stop button 2204, the control unit 205 performs an operation for the specified job.

In the "stop" operation, the control unit 205 sequentially stops all operations from PDL interpretation to rasterization or a print instruction to the printer unit 203, and deletes a job from the print queue. The control unit 205 deletes target job information from the print queue management information 2100. The control unit 205 controls to update the job status list 2205 so as to display the print queue management information 2100 from which the job is deleted.

In the "suspend" operation, the control unit 205 similarly controls to stop the operation. However, the control unit 205 changes the job status 2107 in the print queue management information 2100 to "suspended" without deleting a job from the print queue. The control unit 205 controls to update the operation unit 204 so as to display the print queue management information 2100 representing a state in which the job is suspended.

As a feature of the present invention, control when suspending a print job will be explained in more detail.

Figure 13:
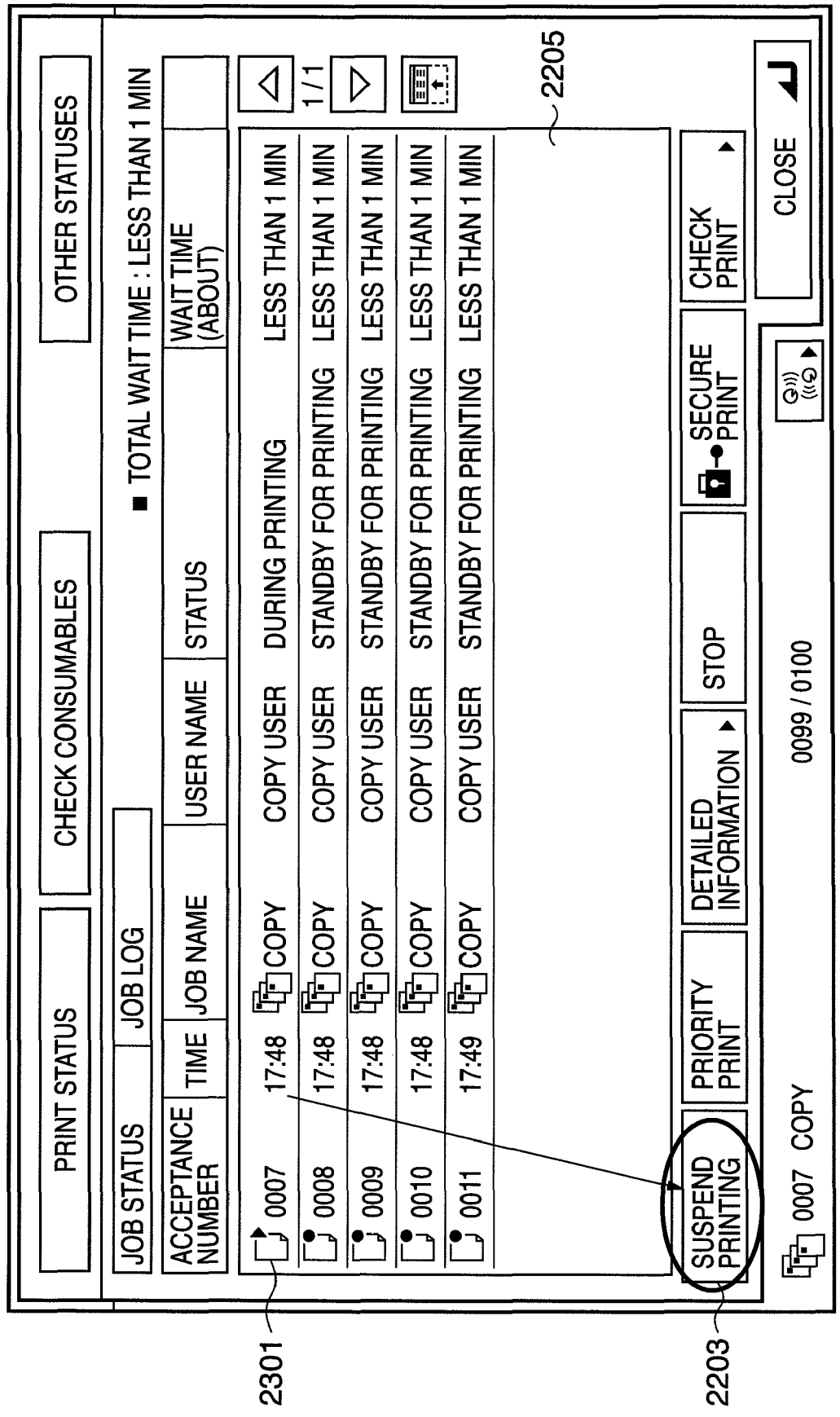
FIG. 13 is a view for explaining an operation to suspend a job being printed.

As shown in FIG. 13, the user or operator can suspend a print job by designating a job 2301 in process from the job status list 2205 and pressing the suspension button 2203. The user or operator suspends a print job for a variety of reasons. For example, the user or operator may want to temporarily stop printing and check the finish of a job being printed. Also, the user or operator may want to confirm in advance whether resources used for a job need to be replenished (even after inputting a print job). Note that resources are paper, and finishing members (e.g., glue and staples) used by sheet processing apparatuses such as a stapler and glue binding apparatus.

For the former suspension reason, when the first job in the print queue is suspended, succeeding jobs also stand by, generating a down time in printout. For the latter suspension reason, other jobs using the same resources must be suspended.

In the embodiment, suspension of a job is controlled without generating any down time while ensuring user or operator friendliness. More specifically, the control unit 205 controls the operation unit 204 to display a UI 2401 capable of selecting a suspension reason as shown in FIG. 14 when performing designation of a job number→suspension of a job.

When the user selects "suspend to check the print result" 2402 on the suspension reason selection UI 2401, the control unit 205 suspends a user-designated job. At the same time, the control unit 205 rewrites the job status 2107 in the print queue management information 2100 from "during printing" to "suspended", and the job standby reason 2108 to "check print result". In order to suppress generation of a down time during the check of the print result, the control unit 205 starts the operation to print the next job managed by the print queue management information 2100. At the same time, the control unit 205 controls the operation unit 204 to shift the job status 2107 of the next job from "standby for printing" to "during printing", and display a job status in which the first job is "suspended" and the next job is "during printing", as shown in FIG. 15. Also, the control unit 205 controls to replace the suspension button 2203 with a resume button 2501 in preparation for an instruction to resume the suspended job.

If printout of the next job ends before the user presses the resume button 2501 for the suspended job, the control unit 205 controls to perform the next printout operation in accordance with the processing order of jobs in the print queue.

Assume that the outputs of respective jobs are accumulated in respective sheet processing apparatuses or separate paper output bins of a sheet processing apparatus, otherwise the printouts of jobs are mixed.

When the user selects "suspend to check (or replenish) paper" 2403 on the suspension reason selection UI 2401, the control unit 205 suspends a user-designated job. Then, the control unit 205 specifies the number of jobs which use the same paper by referring to the paper 2106 for designating the job paper in the print queue management information 2100.

In the example of the print queue management information 2100 shown in FIG. 11, the first job (job number 0007) has "A4 plain paper" as paper designation information. Another job which uses A4 plain paper is a job of job number 0010. The user is considered to stop the job in order to check the remaining number of A4 plain paper sheets. Thus, the control unit 205 controls to also suspend the job of job number 0010.

By this determination, the control unit 205 controls to specify jobs to be suspended and suspend them. The control unit 205 rewrites the job status 2107 in the print queue management information 2100 to "suspended". At the same time, the control unit 205 rewrites the job standby reason 2108 to "check paper". The control unit 205 updates the job status field of job number 0010 corresponding to the suspension reason to display "suspended", as shown in FIG. 16.

Also, the control unit 205 controls to print out a job not corresponding to the suspension reason, i.e., a job using another paper in order to prevent generation of a down time in printing.

In this case, no suspension is designated for jobs other than a job for which the suspension is designated first. That is, by only designating a reason to suspend a given job, the user or operator can automatically suspend jobs for the same reason.

When the user selects "suspend to check the finisher (or replenish members)"; 2404 on the suspension reason selection UI 2401, the control unit 205 suspends a user-designated job. Then, the control unit 205 refers to the finishing designation 2104 used by the suspended job in the print queue management information 2100, and specifies a job which designates the same finishing.

In the example of the print queue management information 2100 shown in FIG. 11, job 0009 using stapling and cutting, and job 0011 using cutting are specified as jobs using the same resources as those of the first job 0007. The control unit 205 controls to suspend jobs 0007, 0009, and 0011, and rewrites the print queue management information 2100. At the same time, the control unit 205 updates the display to a job status as shown in FIG. 17. The job standby reason information 2108 of the jobs in the print queue management information 2100 changes to "check finishing".

When the user selects "suspend to check toner (or replenish toner)" 2405 on the suspension reason selection UI 2401, the control unit 205 suspends a user-designated job. In this case, toner is used commonly to all jobs, so no print operation can start even for jobs other than the target job. That is, the control unit 205 controls to suspend all print jobs managed by the print queue management information 2100. The control unit 205 controls the operation unit 204 to display all job statuses as "suspended", as shown in FIG. 18.

Control when resuming a suspended print job will be explained. The control unit 205 uses the print queue management information 2100 to manage the suspension reason of each job. The control unit 205 can control to resume a suspended job by designating the suspension reason. In resuming jobs, the user or operator need not designate them one by one.

When the user or operator presses the "resume" button 2501 shown in FIG. 15, the control unit 205 displays a job resume UI 2901 shown in FIG. 19 on the operation unit 204. The embodiment has exemplified the four reasons as reasons to suspend a job, and will exemplify four corresponding resume reasons in resume.

The example shown in FIG. 19 illustrates "end of checking the print result" 2902, "end of checking paper" 2903, "end of checking the finisher" 2904, and "end of checking toner" 2905 as items which can be designated by the user.

When the control unit 205 grasps a suspension reason by referring to the job standby reason information 2108 in the print queue management information 2100 and cannot detect the suspension reason, it controls to disable selecting an item corresponding to the suspension reason. In the example shown in FIG. 19, a plurality of suspension reasons do not contain the reason "check toner". The control unit 205 grays out the item of the reason "check toner" on the operation unit 204 so as to disable selection of this item.

Control by the control unit 205 when the job resume button is pressed will be described below.

For example, when the user or operator selects the "end of checking the print result" 2902 on the job resume UI 2901, the control unit 205 specifies the number of a job having information "check the print result" from the job standby reason information 2108 in the print queue management information 2100. After that, the control unit 205 suspends a job in process, and shifts to the print standby state.

The control unit 205 controls to resume the print operation of the first job among specified suspended jobs. The control unit 205 controls to shift, to the print standby state, suspended jobs whose print operation has not started.

Also when the user or operator presses the item 2903, 2904, or 2905, the control unit 205 executes the same control as that for the above-described item, and resumes the print operation of a job corresponding to a designated suspension reason.

Figure 21:
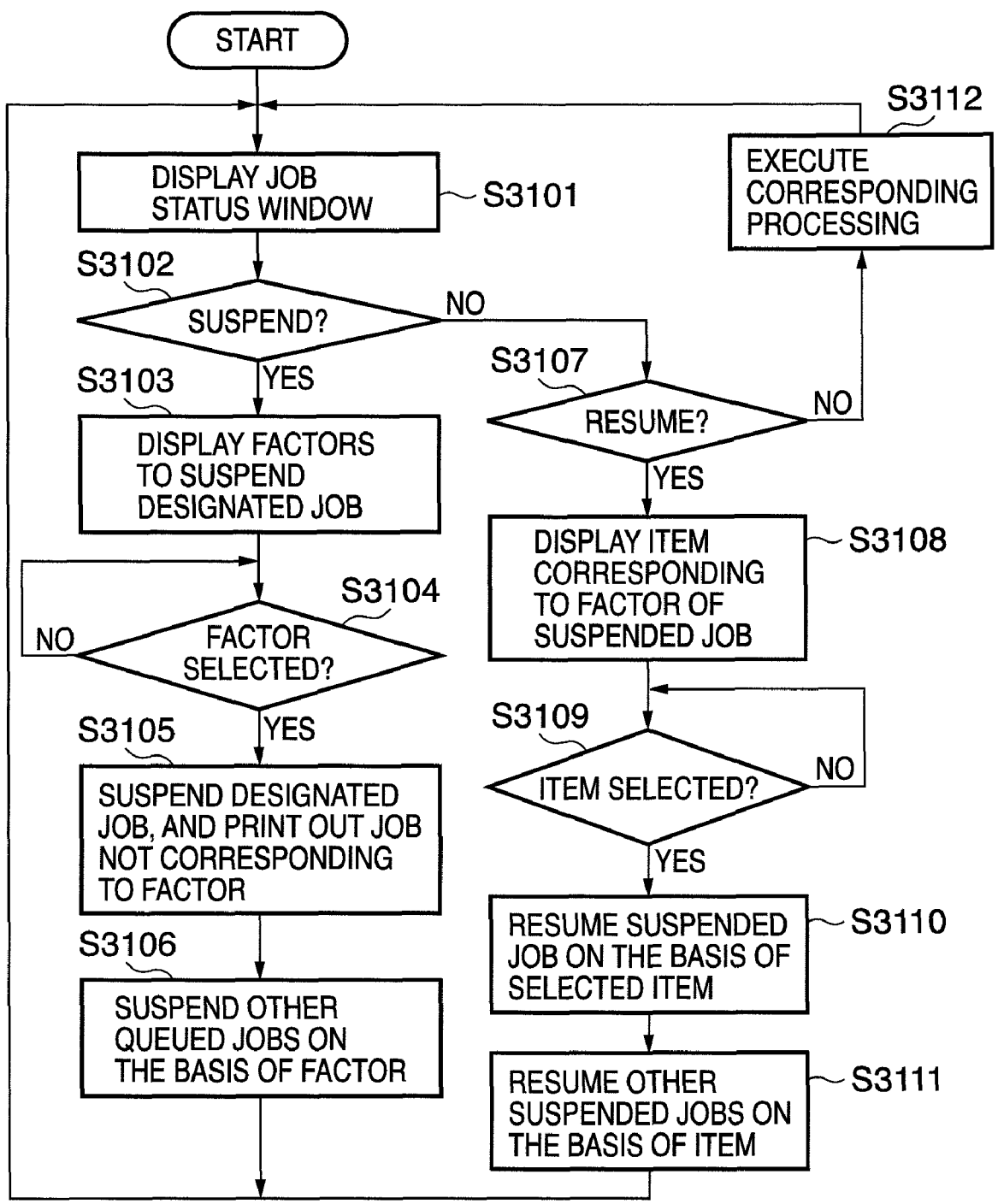
FIG. 21 is a flowchart showing control when suspending a job being printed and control when resuming a suspended job.

FIG. 21 shows control by the control unit 205 when suspending a job being printed and control when resuming a suspended job.

In S3101, the control unit 205 displays the job status window 2201 on the touch panel unit 401 of the operation unit 204 to represent a job processing status on the basis of the print queue management information 2100. In S3102, the control unit 205 determines whether the user or operator has pressed the suspension button 2203 in order to suspend a job in process. If the user or operator designates the job 2301 in process and presses the suspension 2203, as shown in FIG. 13, the control unit 205 advances the control to S3103.

In S3103, the control unit 205 popup-displays the UI 2401 capable of selecting a suspension reason on the touch panel unit 401 of the operation unit 204. If the user or operator selects a suspension reason (suspension factor) on the suspension reason selection UI 2401 in S3104, the control unit 205 advances the control to S3105.

In S3105, the control unit 205 suspends the designated job and prints out another queued job not corresponding to the suspension factor. In S3106, as described above, the control unit 205 searches the print queue management information 2100 on the basis of the suspension factor, and determines whether there is another queued job corresponding to the suspension factor. If there is another corresponding job, the control unit 205 also suspends the job.

If the user or operator presses the resume button 2501 in order to resume the suspended job, the control unit 205 advances the control from S3107 to S3108. If the user or operator presses a button other than the resume button 2501 in S3107, the control unit 205 advances the control to S3112 and performs processing corresponding to the button.

In S3108, the control unit 205 popup-displays the job resume UI 2901 on the touch panel unit 401 of the operation unit 204. If the user or operator selects an item corresponding to a reason to suspend the job on the resume UI 2901 in S3109, the control unit 205 advances the control to S3110.

In S3110, the control unit 205 resumes the suspended job on the basis of the item selected in S3109, and prints the job. In S3111, the control unit 205 searches for the print queue management information 2100 on the basis of the item, and determines whether there is another suspended job corresponding to the item. If there is another corresponding job, the control unit 205 queues the job.

[Another Operation Method Associated with Suspension of Job]

The embodiment can also execute another operation method different from the above-described suspension operation.

When the user presses the job suspension button 2203, as shown in FIGS. 13 and 14, the control unit 205 controls to display the suspension reason selection UI 2401, and prompts the user to select a reason on the UI 2401. Alternatively, the control unit 205 may perform the following control different from this operation and control method.

As shown in FIG. 20, the control unit 205 displays "check the toner amount" 3001, "check the finisher" 3002, and "check paper" 3003. When the user designates a job from the job status list 2205 and presses one of the buttons of the "check the toner amount" 3001, "check the finisher" 3002, and "check paper" 3003, the control unit 205 executes the above-described suspension control.

[Still Another Operation Method Associated with Suspension of Job]

In the aforementioned job suspension control by the control unit 205, the control unit 205 controls to automatically start the print operation of a job not corresponding to a selected reason when a job specified on the suspension reason selection UI 2401 is suspended. In some cases, a plurality of suspension reasons may exist for respective jobs, and the user may want to suspend and resume each job while confirming each suspension reason.

In this case, the control unit 205 executes the following control to provide the user with another operation method.

When the user presses the suspension button 2203, the control unit 205 controls to suspend all jobs accumulated in the print queue. Thereafter, if the user presses the job resume button 2501, the control unit 205 controls to display the job resume UI 2901. In this manner, the suspension of a job can be controlled while prompting the user to confirm a suspension reason.

Effects obtained by the printing system 1000 according to the embodiment are as follows.

The printing system 1000 can solve problems assumed in Description of the Related Art. A user-friendly printing environment adaptable not only to the office environment but also to the POD environment can be built. The printing system 1000 can satisfy needs on actual work site in a printing environment such as the POD environment. Such needs include a need to operate the system at the highest productivity, and a need to reduce the work load on an operator. In particular, the printing system 1000 can achieve the following effects.

Even when a plurality of jobs are input and a job must be suspended, the printing system 1000 can control the suspension of the job in accordance with the suspension factor. Since jobs which can continue printout are kept printed out, the printing system 1000 can maintain printout productivity.

Since jobs are suspended by designating a suspension factor, jobs need not be designated one by one, improving operator operability.

A convenient, flexible printing environment capable of coping with use situations and user requests assumable in the conventionally assumed POD environment can be established. Various mechanisms can be provided toward practical use of a product.

[Other Mechanisms]

A computer (e.g., the PC 103 or 104) may achieve the functions shown in the drawings in the embodiment in accordance with an externally installed program. In this case, data for displaying the same operation windows as those described in the embodiment including operation windows are externally installed to provide various user interface windows on the display of the computer. For example, this has been described with reference to a configuration based on the UI window shown in FIG. 10. In this configuration, the present invention is also applicable to a case where pieces of information including a program are supplied to an output apparatus from a storage medium such as a CD-ROM, flash memory, or FD, or from an external storage medium via a network.

As described above, a storage medium which records software program codes for implementing the functions of the above-described embodiment is supplied to a system or apparatus. The computer (CPU or MPU) of the system or apparatus reads out and executes the program codes stored in the storage medium, achieving the object of the present invention. In this case, the program codes read out from the storage medium implement new functions of the present invention, and the storage medium which stores the program codes constitutes the present invention.

The program form is arbitrary such as an object code, a program executed by an interpreter, or script data supplied to an OS as long as a program function is attained.

The storage medium for supplying the program includes a flexible disk, hard disk, optical disk, magnetooptical disk, MO, CD-ROM, CD-R, CD-RW, magnetic tape, nonvolatile memory card, ROM, and DVD. In this case, the program codes read out from the storage medium implement the functions of the above-described embodiment, and the storage medium which stores the program codes constitutes the present invention.

As another program supply method, a client computer connects to an Internet homepage via the browser of the client computer. Then, the computer program of the present invention or a compressed file containing an automatic installing function is downloaded from the homepage to a recording medium such as a hard disk, thereby supplying the program. The program can also be implemented by grouping program codes which form the program of the present invention into a plurality of files, and downloading the files from different homepages. That is, claims of the present invention also incorporate a WWW server, FTP server, and the like which prompt a plurality of users to download the program files for implementing functional processes of the present invention by a computer.

The program of the present invention can be encrypted, stored in a storage medium such as a CD-ROM, and distributed to a user. A user who satisfies predetermined conditions is prompted to download decryption key information from a homepage via the Internet. The user executes the encrypted program using the key information, and installs the program in the computer.

The functions of the embodiment are implemented when the computer executes the readout program codes. Also, the functions of the embodiment are implemented when an OS (Operating System) or the like running on the computer performs some or all of actual processes on the basis of the instructions of the program codes.

The program codes read out from the storage medium may be written in the memory of a function expansion board inserted into the computer or the memory of a function expansion unit connected to the computer. After that, the CPU of the function expansion board or function expansion unit performs some or all of actual processes on the basis of the instructions of the program codes. These processes also implement the functions of the above-described embodiment.

The present invention may be applied to a system including a plurality of devices or an apparatus formed by a single device. The present invention can also be achieved by supplying a program to the system or apparatus. In this case, the system or apparatus can obtain the effects of the present invention by providing, to the system or apparatus, a storage medium which stores a program represented by software for achieving the present invention.

The present invention is not limited to the above-described embodiment, and various modifications (including organic combinations of embodiments) can be made without departing from the gist of the invention, and are not excluded from the scope of the invention. For example, in the embodiment, the control unit 205 in the printing apparatus 100 serves as a main controller for various control operations. Instead, an external controller in a housing different from the printing apparatus 100 may also execute some or all of various control operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-234364, filed on Aug. 30, 2006, which is hereby incorporated by reference herein in its entirety.

What is claimed is:

1. A printing apparatus comprising:
   an execution unit that executes a print job;
   a first reception unit that receives a suspension instruction to suspend the print job being executed by the execution unit from a user of the printing apparatus;
   a second reception unit that receives a suspension reason that the user wants to cause the printing apparatus to suspend the print job being executed by the execution unit from the user of the printing apparatus;
   a first specification unit that specifies a print job corresponding to the suspension reason received by the second reception unit among unexecuted print jobs following the print job being executed by the execution unit; and
   a first control unit that controls the execution unit to not execute the unexecuted print job specified by the specification unit after the execution unit suspends the print job being executed in response to the suspension instruction received by the first reception unit.

2. The apparatus according to claim 1, wherein the first specification unit specifies the print job in which a sheet of the same type as the print job being executed by the execution unit among unexecuted print jobs following the print job being executed by the execution unit in a case where confirmation or refill of the sheet used for the print job being executed by the execution unit is received as the suspension reason by the second reception unit.

3. The apparatus according to claim 1, further comprising:
   a post-processing unit that performs post-processing to a sheet on which an image is printed when the print job is executed by the execution unit,
   wherein the first specification unit specifies an unexecuted print job following the print job to perform the post-processing from among unexecuted print jobs following the print job being executed by the execution unit in a case where confirmation or refill of a member used for the post-processing performed by the post-processing unit is received as the suspension reason by the second reception unit.

4. The apparatus according to claim 1, wherein the first specification unit specifies all unexecuted print jobs following the print job being executed by the execution unit in a case where confirmation or refill of the printing material used for the print job being executed by the execution unit is received as the suspension reason by the second reception unit.

5. The apparatus according to claim 1, wherein the first control unit controls the execution unit so as to execute a print job different from the print job specified by the specification unit and not corresponding to the suspension reason among print jobs following the print job suspended after the print job being executed by the execution unit is suspended.

6. The apparatus according to claim 1, further comprising:
a third reception unit that receives a resumption instruction to resume the print job suspended by the first control unit from the user of the printing apparatus;
a fourth reception unit that receives a resumption reason for resuming the print job suspended by the first control unit from the user of the printing apparatus;
a second specification unit that specifies a print job corresponding to the resumption reason received by the fourth reception unit among unexecuted print jobs following the print job suspended by the first control unit; and
a second control unit that controls the first control unit so as to execute the print job specified by the second specification unit after the print job suspended by the first control unit is resumed in response to the resumption instruction received by the third reception unit.

7. A control method of a printing apparatus comprising the steps of:
executing a print job;
receiving a suspension instruction to suspend the print job being executed in the executing step from a user of the printing apparatus;
receiving a suspension reasons that the user wants to cause the printing apparatus to suspend the print job being executed in the executing step from the user of the printing apparatus;
specifying a print job corresponding to the received suspension reason among unexecuted print jobs following the print job being executed in the executing step; and
controlling execution in the executing step to not execute the unexecuted print job specified in the specifying step after the execution unit suspends the print job being executed in response to the received suspension instruction.

8. A non-transitory computer-readable storage medium storing a computer program executable by a computer to execute a control method of a printing apparatus, the method comprising the steps of:
executing a print job;
receiving a suspension instruction to suspend the print job being executed in the executing step from a user of the printing apparatus;
receiving a suspension reason that the user wants to cause the printing apparatus to suspend the print job being executed in the executing step from the user of the printing apparatus;
specifying a print job corresponding to the received suspension reason among unexecuted print jobs following the print job being executed in the executing step; and
controlling execution in the executing step to not execute the unexecuted print job specified in the specifying step after the execution unit suspends the print job being executed in response to the received suspension instruction.

9. A printing apparatus comprising:
an execution unit that executes a print job;
a reception unit that receives a suspension reason that the user wants to cause the printing apparatus to suspend the print job being executed by the execution unit from a user of the printing apparatus;
a specification unit that specifies a print job corresponding to the suspension reason received by the reception unit among unexecuted print jobs following the print job being executed by the execution unit; and
a control unit that controls the execution unit to not execute the unexecuted print job specified by the specification unit after the execution unit suspends the print job being executed.

10. A control method of a printing apparatus comprising the steps of:
executing a print job;
receiving a suspension reason that the user wants to cause the printing apparatus to suspend the print job being executed in the executing step from a user of the printing apparatus;
specifying a print job corresponding to the suspension reason received in the receiving step among unexecuted print jobs following the print job being executed in the executing step; and
controlling execution in executing step to not execute the unexecuted print job specified in the specifying step after the print job being executed is suspended.

11. A non-transitory computer-readable storage medium storing a computer program executable by a computer to execute a control method of a printing apparatus, the method comprising the steps of:
executing a print job;
receiving a suspension reason that the user wants to cause the printing apparatus to suspend the print job being executed in the executing step from a user of the printing apparatus;
specifying a print job corresponding to the suspension reason received in the receiving step among unexecuted print jobs following the print job being executed in the executing step; and
controlling execution in executing step to not execute the unexecuted print job specified in the specifying step after the print job being executed is suspended.

* * * * *